(12) United States Patent
Proudler et al.

(10) Patent No.: US 7,904,730 B2
(45) Date of Patent: Mar. 8, 2011

(54) SYSTEM FOR PROVIDING A TRUSTWORTHY USER INTERFACE

(75) Inventors: Graeme John Proudler, Bristol (GB); Boris Balacheff, Bristol (GB); Liqun Chen, Bristol (GB); David Chan, Monte Soreno, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 198 days.

(21) Appl. No.: 11/861,127

(22) Filed: Sep. 25, 2007

(65) Prior Publication Data

US 2008/0022128 A1    Jan. 24, 2008

Related U.S. Application Data

(63) Continuation of application No. 09/979,905, filed on Nov. 27, 2001, now Pat. No. 7,302,585.

(51) Int. Cl.
*G06F 12/14* (2006.01)
(52) U.S. Cl. .......................................... 713/189; 726/20
(58) Field of Classification Search .................. 713/189; 726/20
See application file for complete search history.

(56) References Cited

U.S. PATENT DOCUMENTS

| | | | |
|---|---|---|---|
| 5,214,702 A | 5/1993 | Fischer | 380/30 |
| 5,280,583 A | 1/1994 | Nakayama et al. | |
| 5,361,359 A | 11/1994 | Tajalli et al. | 395/700 |
| 5,473,692 A | 12/1995 | Davis | 380/25 |
| 5,572,590 A | 11/1996 | Chess | 713/200 |
| 5,619,571 A | 4/1997 | Sandstrom et al. | |
| 5,659,616 A | 8/1997 | Sudia | 705/76 |
| 5,701,343 A * | 12/1997 | Takashima et al. | 705/51 |
| 5,822,435 A | 10/1998 | Boebert et al. | 713/192 |
| 5,867,579 A | 2/1999 | Saito | 705/57 |
| 5,870,721 A | 2/1999 | Norris | 705/38 |
| 5,903,732 A | 5/1999 | Reed et al. | 395/200.59 |
| 5,907,619 A | 5/1999 | Davis | 380/23 |
| 5,915,024 A | 6/1999 | Kitaori et al. | 713/176 |
| 5,936,220 A * | 8/1999 | Hoshino et al. | 235/380 |
| 5,953,528 A | 9/1999 | Sullivan | 395/703 |
| 5,953,538 A | 9/1999 | Duncan et al. | |

(Continued)

FOREIGN PATENT DOCUMENTS

EP    0 386 867 A2    9/1990

(Continued)

OTHER PUBLICATIONS

Yee, B., "Using Secure Compressors," Doctoral Thesis-Carnegie Melon University, pp. 1-94 (May 1994).

(Continued)

*Primary Examiner* — Michael Pyzocha

(57) ABSTRACT

The preferred embodiment of the invention comprises a computer system which employs a trusted display processor (260), which has a trusted processor (300) and trusted memory (305, 315, 335, 345) physically and functionally distinct from the processor and memory of the computer system. The trusted display processor (260) is immune to unauthorised modification or inspection of internal data. It is physical to prevent forgery, tamper-resistant to prevent counterfeiting, and has crypto functions (340) to securely communicate at a distance. The trusted display processor (260) interacts with a user's smartcard (122) in order to extract and display a trusted image, or seal (1000), generate a digital signature of the bitmap of a document image and control the video memory (315) so that other processes of the computer system cannot subvert the image during the signing process. The user interacts with the trusted display processor via a trusted switch (135).

35 Claims, 9 Drawing Sheets

U.S. PATENT DOCUMENTS

| | | | | |
|---|---|---|---|---|
| 5,974,142 | A * | 10/1999 | Heer et al. | 379/442 |
| 5,990,912 | A | 11/1999 | Swanson | 345/568 |
| 6,018,724 | A * | 1/2000 | Arent | 705/44 |
| 6,023,765 | A | 2/2000 | Kuhn | 713/200 |
| 6,029,245 | A | 2/2000 | Scanlan | 713/200 |
| 6,044,158 | A * | 3/2000 | Terpening et al. | 380/255 |
| 6,057,862 | A | 5/2000 | Margulis | 345/535 |
| 6,092,202 | A * | 7/2000 | Veil et al. | 726/27 |
| 6,138,239 | A | 10/2000 | Veil | 713/200 |
| 6,282,535 | B1 | 8/2001 | Pham et al. | 707/4 |
| 6,286,102 | B1 * | 9/2001 | Cromer et al. | 726/35 |
| 6,330,670 | B1 | 12/2001 | England et al. | 713/2 |
| 6,417,819 | B1 * | 7/2002 | Matsumoto et al. | 345/1.1 |
| 6,453,416 | B1 | 9/2002 | Epstein | 713/170 |
| 6,490,049 | B1 * | 12/2002 | Cunnagin et al. | 358/1.13 |
| 6,515,988 | B1 | 2/2003 | Eldridge et al. | 370/389 |
| 6,606,744 | B1 | 8/2003 | Mikurak | 717/174 |
| 6,615,166 | B1 | 9/2003 | Guheen et al. | 703/27 |
| 6,671,805 | B1 | 12/2003 | Brown et al. | 713/176 |
| 6,757,826 | B1 | 6/2004 | Paltenghe | 713/170 |
| 6,959,382 | B1 | 10/2005 | Kinnis et al. | 713/170 |
| 7,302,698 | B1 | 11/2007 | Proudler et al. | 726/2 |
| 2001/0016838 | A1 | 8/2001 | Landrock | 705/80 |
| 2001/0043227 | A1 * | 11/2001 | Shaw | 345/582 |
| 2002/0012432 | A1 | 1/2002 | England et al. | 380/231 |
| 2002/0059364 | A1 * | 5/2002 | Coulthard et al. | 709/203 |
| 2003/0030680 | A1 | 2/2003 | Cofta et al. | 345/864 |

FOREIGN PATENT DOCUMENTS

| | | |
|---|---|---|
| EP | 0 717 337 A1 | 6/1996 |
| EP | 0 926 605 A1 | 6/1999 |
| EP | 1 030 237 A1 | 8/2000 |
| EP | 1 085 396 A1 | 3/2001 |
| EP | 1159662 B1 | 5/2001 |
| GB | 0020441.2 | 8/2000 |
| WO | 94/01821 | 1/1994 |
| WO | 00/31644 | 6/2000 |
| WO | 00/54125 | 6/2000 |
| WO | 00/48063 | 8/2000 |
| WO | 00/73913 A1 | 12/2000 |
| WO | 01/27722 A1 | 4/2001 |

OTHER PUBLICATIONS

Boot Integrity Services Application Programming Interface, Version 1.0, Intel Corporation, pp. 1-60 (Dec. 28, 1998).

"Information Technology-Security Techniques-Entity Authentication; Part 3: Mechanisms using digital signature techniques," ISO/IEC 9798-3, Second Edition, pp. 1-6 (1998).

Information Technology-Security techniques-key management-Part 3: Mechanisms using assymetric techniques, ISO/IEC 11770-3, pp. 1-34 (1999).

Trusted Platform Computing Alliance, Main Specification Version 1.0, 284 pp. (Jan. 25, 2001).

Anderson, R., et al., "Tamper Resistance-a Cautionary Note," 16 pages, located at Internet address <www.cl.cam.ac.uk/~mgk25/tamper.html> (1996).

Wiseman, S., et al., "The Trusted Path between SMITE and the User," IEEE Proceedings of the Symposium on Security and Privacy, pp. 147-155 (1988).

Woo, T.Y.C., et al., "Authentication for Distributed Systems," Computer, vol. 25, No. 1, pp. 39-52 (Jan. 1992).

Intel, "Wired for management Baseline specification v.2.0," Boot Integrity Services Application Programming Interface Version 1.0, 64 pp. (Dec. 28, 1998).

Building a Foundation of Trust in the PC, the Trusted computing Platform Alliance, 9 pages, located at Internet address, <www.trustedpc.org/home/home.html> (Jan. 2000).

\* cited by examiner

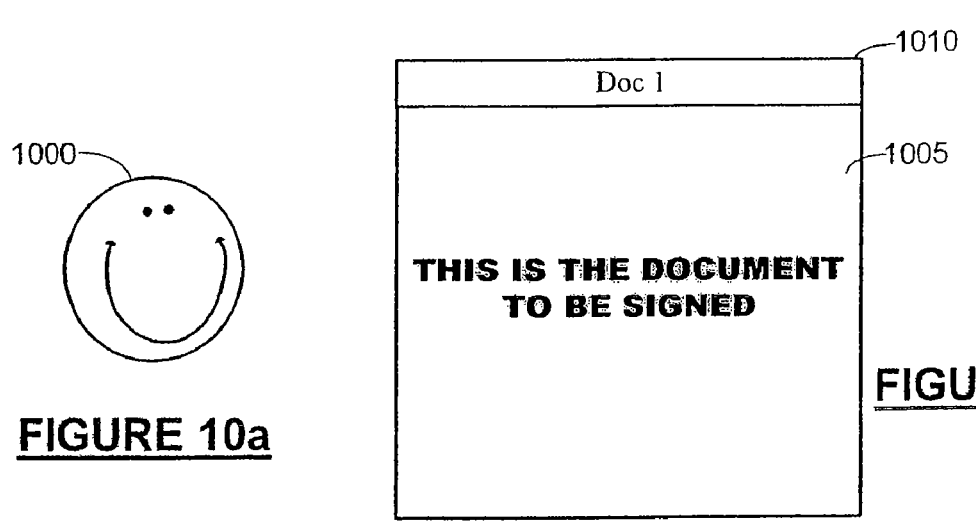
FIGURE 10a
FIGURE 10b
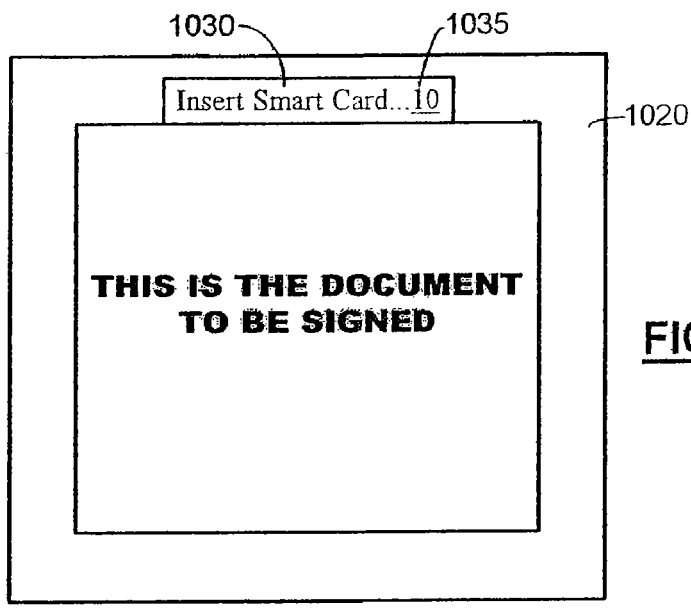
FIGURE 10c
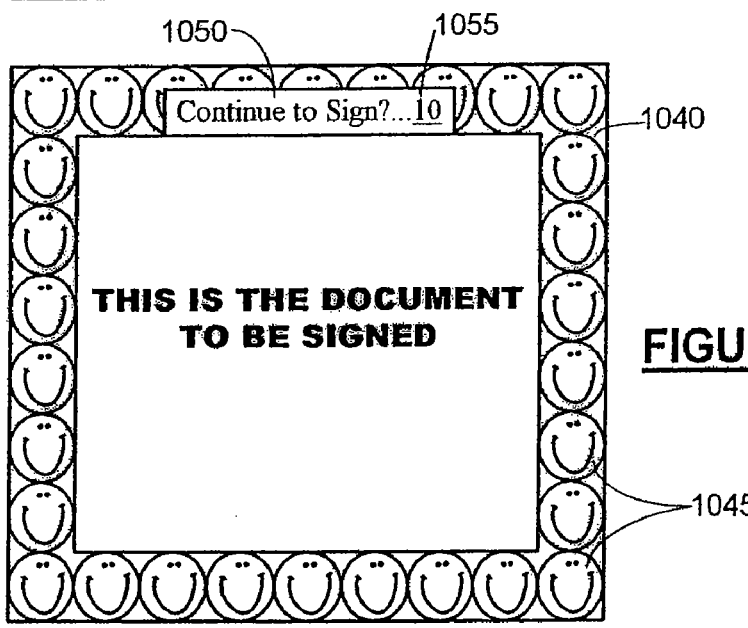
FIGURE 10d ued States Patent No. US 7,904,730 B2

SYSTEM FOR PROVIDING A TRUSTWORTHY USER INTERFACE

CROSS-REFERENCE TO RELATED APPLICATIONS

This is a continuation of U.S. patent application Ser. No. 09/979,905, filed on Nov. 27, 2001, now U.S. Pat. No. 7,302,585.

TECHNICAL FIELD

The present invention relates to apparatus and methods for providing a user interface in a system, and in particular a user interface which provides a user with a high degree of confidence that the system is operating in a trustworthy fashion.

BACKGROUND ART

Conventional prior art mass market computing platforms include the well-known personal computer (PC) and competing products such as the Apple Macintosh™, and a proliferation of known palm-top and laptop personal computers. Generally, markets for such machines fall into two categories, these being domestic or consumer, and corporate. A general requirement for a computing platform for domestic or consumer use is a relatively high processing power, Internet access features, and multi-media features for handling computer games. For this type of computing platform, the Microsoft Windows™ 95 and 98 operating system products and Intel processors, so-called WinTel platforms, dominate the market.

On the other hand, for business use, there are a plethora of available proprietary computer platform solutions available aimed at organizations ranging from small businesses to multi-national organizations. In many of these applications, a server platform provides centralized data storage, and application functionality for a plurality of client stations. For business use, other key criteria are reliability, remote access, networking features, and security features. For such platforms, the Microsoft Windows NT 4.0™ operating system is common, as well as the UNIX and, more recently, the Linux operating systems.

Windows-type operating systems allow a user to run separate applications in separate windows, and provide a so-called WIMP (windows, icons, menus and pointers) interface, whereby a user typically interacts with applications using a keyboard to enter data and a mouse to select options and control applications via dialog boxes and drop-down (or pull-up) menus.

With the increase in commercial activity transacted over the Internet, known as "e-commerce", there has been much interest in the prior art on enabling data transactions between computing platforms, over the Internet. In particular, it is perceived to be important for users to be able to enter into binding contracts over the Internet, without the need for the current standard hand-signed paper contract. However, because of the potential for fraud and manipulation of electronic data, in such proposals, fully automated transactions with distant unknown parties on a wide-spread scale as required for a fully transparent and efficient market place have so far been held back. The fundamental issue is one of trust between users and their computer platforms, and between interacting computer platforms, for the making of such transactions.

There have been several prior art schemes which are aimed at increasing the security and trustworthiness of computer platforms. Predominantly, these rely upon adding in security features at the application level, that is to say the security features are not inherently embedded in the kernel of operating systems, and are not built in to the fundamental hardware components of the computing platform. Portable computer devices have already appeared on the market which include a smartcard, which contains data specific to a user, which is input into a smartcard reader on the computer. Presently, such smartcards are at the level of being add-on extras to conventional personal computers, and in some cases are integrated into a casing of a known computer. Although these prior art schemes go some way to improving the security of computer platforms, the levels of security and trustworthiness gained by prior art schemes may be considered insufficient to enable widespread application of automated transactions between computer platforms. Before businesses expose significant value transactions to electronic commerce on a widespread scale, they will require greater confidence in the trustworthiness of the underlying technology.

In the applicant's co-pending International Patent Applications 'Trusted Computing Platform' PCT/GB 00/00528, filed on 15 Feb. 2000, and 'Smartcard User Interface for Trusted Computing Platform' PCT/GB 00/00752, filed on 3 Mar. 2000, the entire contents of which are incorporated herein by reference, there is disclosed a concept of a 'trusted computing platform' comprising a computing platform which has a 'trusted component' in the form of a built-in hardware component. Two computing entities each provisioned with such a trusted component may interact with each other with a high degree of 'trust'. That is to say, where the first and second computing entities interact with each other the security of the interaction is enhanced compared to the case where no trusted component is present, because:

A user of a computing entity has higher confidence in the integrity and security of his own computer entity and in the integrity and security of the computer entity belonging to the other party;

Each entity is confident that the other entity is in fact the entity which it purports to be;

Where one or both of the entities represent a party to a transaction, e.g. a data transfer transaction, because of the in-built trusted component, third party entities interacting with the entity have a high degree of confidence that the entity does in fact represent such a party;

The trusted component increases the inherent security of the entity itself, through verification and monitoring processes implemented by the trusted component; and The computer entity is more likely to behave in the way it is expected to behave.

While the concept of a trusted component as described in the co-pending application goes a long way to providing to a user with a substantial degree of trust in a computer platform, there are still times when the user requires an even higher degree of trust in his equipment, for example during an electronic transaction, such as digitally signing a document, or transferring funds from the platform to a remote platform.

As has been indicated above, the conventional method of signing a document is to physically write a signature on the medium (usually paper) upon which an image of a document is reproduced. This method has the advantages that it is clear what is being signed, and the signed image is proof of what was signed. However, it does not meet the needs of e-commerce.

Nowadays it is also possible to digitally sign a document, using a conventional computer platform and standard encryption techniques. In conventional computer platforms, however, the present inventors have appreciated that the electronic rendition of a document which is digitally signed is typically not the same rendition of the document that is visible to the user. It is therefore possible for a user to unintentionally sign data that is different from that which he intended to sign. Conversely, it is also possible for a user to intentionally sign data and later fraudulently claim that the signed data does not correspond to that displayed to him by the computer platform. Such problems would still be the present, even if a trusted platform, as described above, were used.

Conventional electronic methods of signing are well known to those skilled in the art. Essentially, digital data is compressed into a digest, for example by the use of a hash function. Then that digest is encrypted by the use of some encryption method that has been initialised by a secret key (or simply a 'secret'). This is normally done on a computer platform, such as a PC. One implementation is to sign data using a private encryption key held secret on a user's smartcard, which is plugged into a smartcard reader attached to the computer platform. In the specific case of a textual document, the digital data may be the file produced by a word processor application, such as Microsoft's Notepad, Wordpad, or Word. As usual, the act of signing implies that the signer accepts some legal responsibility for the meaning of the data that was signed.

Hash functions are well-known in the prior art and comprise one way functions which are capable of generating a relatively small output data from a relatively large quantity of input data, where a small change in the input data results in a significant change in the output data. Thus, a data file to which is applied a hash function results in a first digest data (the output of the hash function). A small change e.g. a single bit of data in the original data file will result in a significantly different output when the hash function is reapplied to the modified data file. Thus, a data file comprising megabytes of data may be input into the hash function and result in a digital output of the order of 128 to 160 bits length, as the resultant digest data. Having a relatively small amount of digest data generated from a data file stored in the reserved directory is an advantage, since it takes up less memory space and less processing power in the trusted component.

During known signing processes, a user will typically interpret a document as it has been rendered on the computer's monitor at normal magnification and resolution. In existing applications, the user's smartcard signs data in a format that is the representation of the document by the application used to create and/or manipulate the document. The present inventors believe, however, that there is potential for software to send data to the smartcard that has a different meaning from that understood by the user when viewing the screen. This possibility may be sufficient reason to introduce doubt into the validity of conventional methods of digitally signing electronic representations of documents that are to be interpreted by people.

DISCLOSURE OF THE INVENTION

The present invention aims to provide a user with greater trust during a trusted operation by providing a trusted user interface.

In accordance with a first aspect, the present invention provides a data processing system capable of operating in a trusted operating mode, the data processing system comprising:

main processing means for executing at least one application process;

a trusted component comprising means for executing a trusted process in a trusted operating mode and means for generating user feedback signals;

at least one user feedback device; and user feedback processing means for receiving said user feedback signals and controlling the user feedback device on the basis of the signals, wherein the trusted component comprises means for controlling the user feedback processing means to cause the user feedback device to provide an indication that the data processing system is operating in a trusted operating mode.

In preferred embodiments the data processing system comprises secure user input means, in communication with the trusted component via a secure communications path, by which a user may securely interact with the trusted process.

In a preferred embodiment of the data processing system:

the main processing means includes means to execute at least one application process and generate signals characterising a main image to be displayed;

the user feedback processing means comprises display processing means for receiving said signals and generating respective display signals for driving a visual display unit to display the main image; and the trusted component comprises means to acquire and/or generate trusted image data and means to control the display processing means to combine a respective trusted image with at least a portion of the main image in order to indicate to a user that the data processing system is operating in the trusted operating mode.

In preferred embodiments the data processing system further comprises a secure token reader for reading data from and/or writing data to a removable secure token, and a removable token containing data characterising the trusted image, wherein the trusted component comprises means to receive said data from the secure token.

Other aspects and embodiments of the invention will become apparent from the following description, claims and drawings.

BRIEF DESCRIPTION OF THE DRAWINGS

Embodiments of the present invention will now be described in detail with reference to the accompanying drawings, of which:

FIG. 10*a* is a diagram which illustrates an exemplary trusted image;

FIGS. 10*b* to 10*d* are diagrams which illustrate the visual steps in signing a document image.

BEST MODE FOR CARRYING OUT THE INVENTION, & INDUSTRIAL APPLICABILITY

Figure 1:
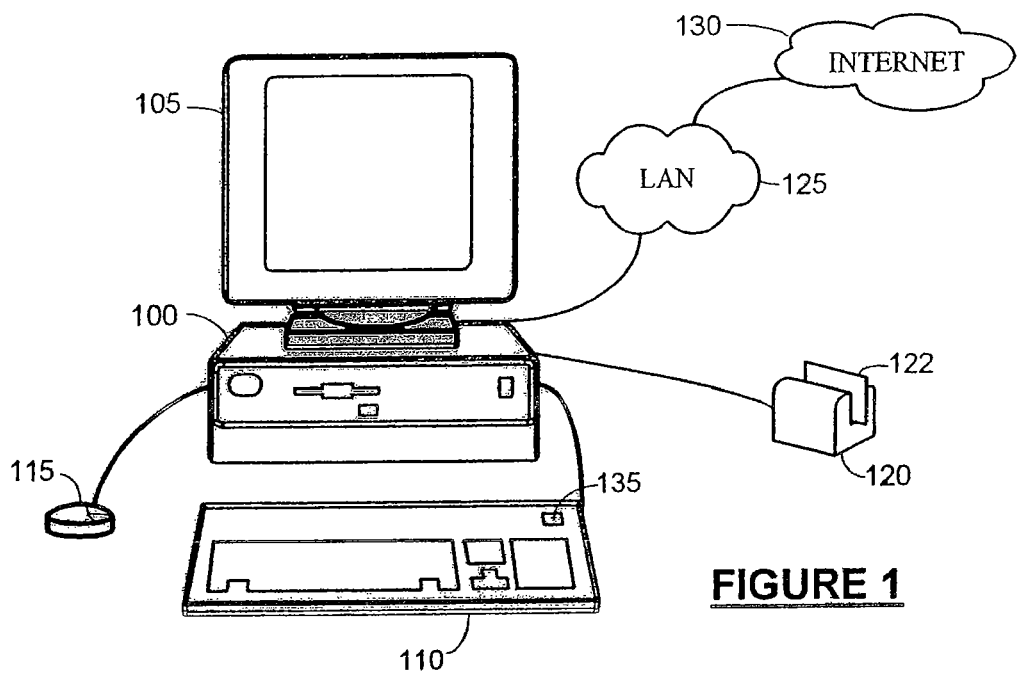
FIG. 1 is a diagram which illustrates a computer system suitable for operating in accordance with the preferred embodiment of the present invention.

The preferred embodiment utilises a trusted component that most conveniently uses some of the characteristics of the 'trusted component' described in the applicant's co-pending European patent application number 99301100.6. In that application, the trusted component is a hardware device, comprising a processor programmed to measure an integrity metric of its host computer, compare it with a true value of the integrity metric and communicate the integrity (or otherwise) of the host computer to users or other host computers. The significant similarities between that trusted component and the trusted component in the preferred embodiment herein are:

that they both use cryptographic processes but preferably do not provide an external interface to those cryptographic processes;

that they are both tamper-resistant or tamper-detecting, so that their operation cannot be subverted, at least without the knowledge of the legitimate user; and that they both preferably consist of one physical hardware component that is both physically and functionally independent of the host computer on which it resides.

Such independence is achieved by the trusted component having its own processing capability and memory.

Techniques relevant to tamper-resistance are well known to those skilled in the art of security. These techniques include methods for resisting tampering (such as appropriate encapsulation of the trusted device), methods for detecting tampering (such as detection of out of specification voltages, X-rays, or loss of physical integrity in the trusted device casing), and methods for eliminating data when tampering is detected. Further discussion of appropriate techniques can be found at http:www.cl.cam.ac.uk/~mgk25/tamper.html. It will be appreciated that, although tamper-proofing is a most desirable feature of the present invention, it does not enter into the normal operation of the invention and, as such, is beyond the scope of the present description.

In this description, the term 'trusted', when used in relation to a physical or logical component or an operation or process, implies that the behaviour thereof is predictable under substantially any operating condition and highly resistant to interference or subversion by external agents, such as subversive application software, viruses or physical interference.

The term 'host computer' as used herein refers to a data processing apparatus having at least one data processor, at least one form of data storage and some form of communications capability for interacting with external entities, such as peripheral devices, users and/or other computers locally or via the Internet. The term 'host computer system' in addition to the host computer itself includes standard external devices, such as a keyboard, mouse and VDU, that attach to the host computer.

The term 'document', as used herein, includes any set of data that can be visualised using a host computer system. Commonly a document will be a textual document, such as a contract. However, a document may comprise graphics, or pictures, instead of, or as well as, text. In general, a document may comprise a single page or multiple pages.

The term 'pixmap', as used herein, is used broadly to encompass data defining either monochrome or colour (or grayscale) images. Whereas the term 'bitmap' may be associated with a monochrome image only, for example where a single bit is set to one or zero depending on whether a pixel is 'on' or 'off', 'pixmap' is a more general term, which encompasses both monochrome and colour images, where colour images may require up to 24 bits or more to define the hue, saturation and intensity of a single pixel.

As will become apparent, the trusted component according to the preferred embodiment herein provides a secure user interface and, in particular, controls at least some of the display functionality of its host computer. The trusted component herein may or may not also acquire integrity metrics according to the trusted component in applicant's co-pending patent application, although such acquisition of integrity metrics will not be considered herein.

In essence, the preferred embodiment enables a user to digitally sign a document stored on a host computer using the private key of the user's smartcard, or other form of secure token such as a cryptographic co-processor. The signing is enacted by a trusted display processor (i.e. the trusted component) of the host computer under conditions that provide the user with a high level of confidence that the document being viewed on screen is in fact the document the smartcard is signing. In particular, the smartcard carries trusted image data, or a 'seal', which is passed to the host computer over a secure channel and displayed by the trusted component during the signing procedure. It is in part the display of the trusted image, which is typically unique to the user, which provides the user with the confidence that the trusted component is in control of the signing operation. In addition, in the preferred embodiment, the host computer provides a trusted input device, connected directly to the trusted display processor, by which the user can interact with the host computer in a manner which cannot be subverted by other functions of the host computer.

More particularly, the trusted display processor or a device with similar properties is associated with video data at a stage in the video processing beyond the point where data can be manipulated by standard host computer software. This allows the trusted display processor to display data on a display surface without interference or subversion by the host computer software. Thus, the trusted display processor can be certain what image is currently being displayed to the user. This is used to unambiguously identify the image (pixmap) that a user is signing. A side-effect of this is that the trusted display processor may reliably display any of its data on the display surface, including, for example, the integrity metrics of the prior patent application, or user status messages or prompts.

It will be appreciated that, while the preferred embodiment is described in relation to a digital signing operation, the concept of providing a trusted user interface is far more broadly applicable to any operation for which a user needs to be able to trust his host computer system, for example during an electronic transaction.

FIG. 1 illustrates a host computer system according to the preferred embodiment, in which the host computer is a Personal Computer, or PC, which operates under the Windows NT™ operating system. According to FIG. 1, the host computer 100 is connected to a visual display unit (VDU) 105, a keyboard 110, a mouse 115 and a smartcard reader 120, and a local area network (LAN) 125, which in turn is connected to the Internet 130. Herein, the smartcard reader is an independent unit, although it may be an integral part of the keyboard. In addition, the host computer has a trusted input device, in this case a trusted switch 135, which is integrated into the keyboard. The VDU, keyboard, mouse, and trusted switch can be thought of as the human/computer interface (HCI) of the host computer. More specifically, the trusted switch and the display, when operating under trusted control, as will be described, can be thought of as a 'trusted user interface'. FIG. 1 also illustrates a smartcard 122 for use in the present embodiment as will be described.

Figure 2:
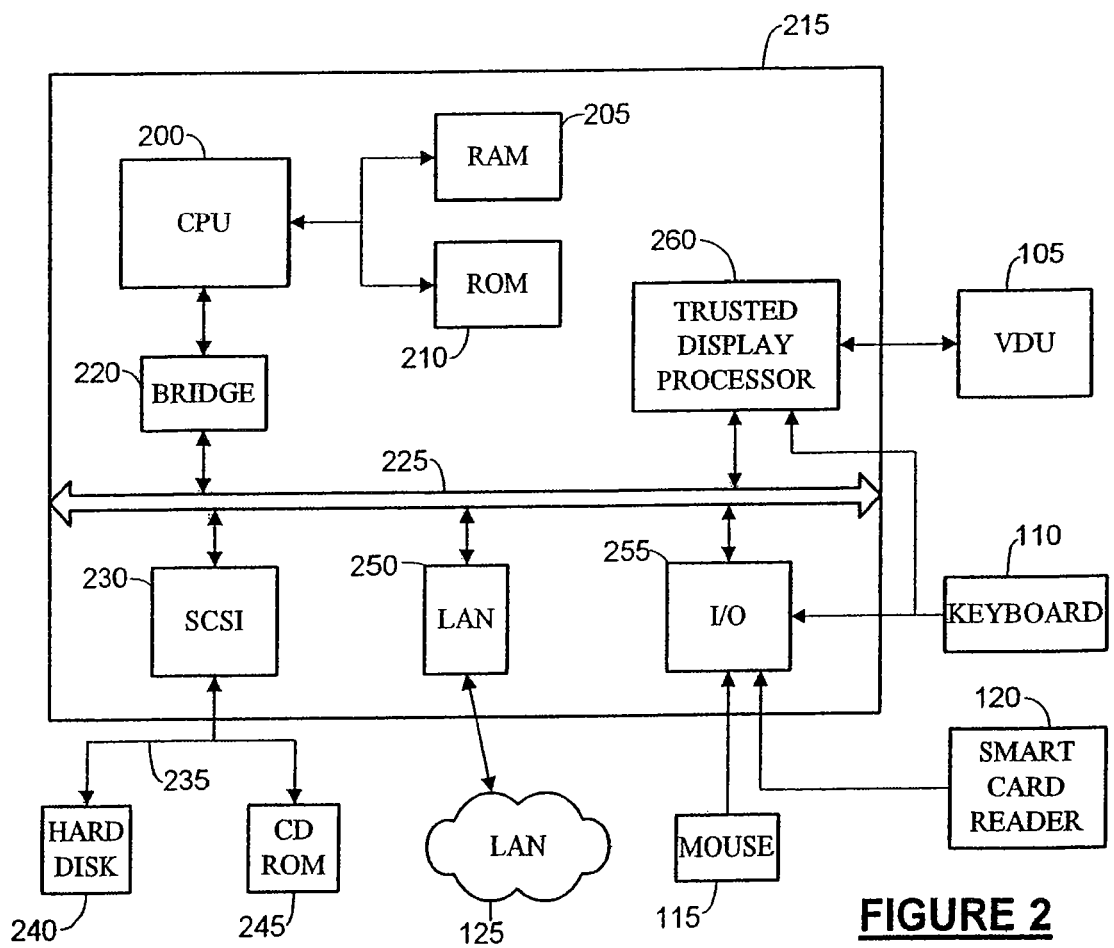
FIG. 2 is a diagram which illustrates a hardware architecture of a host computer suitable for operating in accordance with the preferred embodiment of the present invention.

FIG. 2 shows a hardware architecture of the host computer of FIG. 1.

According to FIG. 2, the host computer 100 comprises a central processing unit (CPU) 200, or main processor, connected to main memory, which comprises RAM 205 and ROM 210, all of which are mounted on a motherboard 215 of the host computer 100. The CPU in this case is a Pentium™ processor. The CPU is connected via a PCI (Peripheral Component Interconnect) bridge 220 to a PCI bus 225, to which are attached the other main components of the host computer 100. The bus 225 comprises appropriate control, address and data portions, which will not be described in detail herein. For a detailed description of Pentium processors and PCI architectures, which is beyond the scope of the present description, the reader is referred to the book, "The Indispensable PC Hardware Handbook", 3rd Edition, by Hans-Peter Messmer, published by Addison-Wesley, ISBN 0-20140399-4. Of course, the present embodiment is in no way limited to implementation using Pentium processors, Windows™ operating systems or PCI buses.

The other main components of the host computer 100 attached to the PCI bus 225 include: a SCSI (small computer system interface) adaptor connected via a SCSI bus 235 to a hard disk drive 240 and a CD-ROM drive 245; a LAN (local area network) adaptor 250 for connecting the host computer 100 to a LAN 125, via which the host computer 100 can communicate with other host computers (not shown), such as file servers, print servers or email servers, and the Internet 130; an 10 (input/output) device 225, for attaching the keyboard 110, mouse 115 and smartcard reader 120; and a trusted display processor 260. The trusted display processor handles all standard display functions plus a number of further tasks, which will be described in detail below. 'Standard display functions' are those functions that one would normally expect to find in any standard host computer 100, for example a PC operating under the Windows NT™ operating system, for displaying an image associated with the operating system or application software. It should be noted that the keyboard 110 has a connection to the 10 device 255, as well as a direct connection to the trusted display processor 260.

All the main components, in particular the trusted display processor 260, are preferably also integrated onto the motherboard 215 of the host computer 100, although, sometimes, LAN adapters 250 and SCSI adapters 230 can be of the plugin type.

Figure 3:
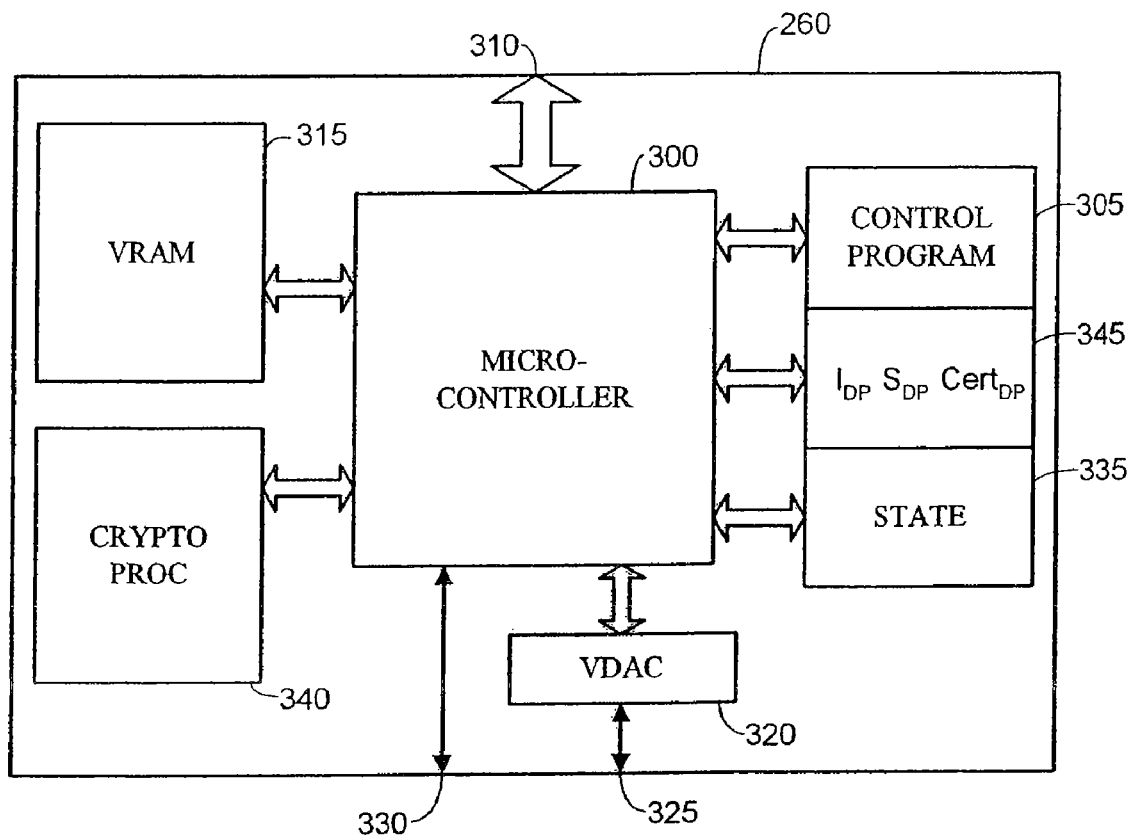
FIG. 3 is a diagram which illustrates a hardware architecture of a trusted display processor suitable for operating in accordance with the preferred embodiment of the present invention.

FIG. 3 shows a preferred physical architecture for the trusted display processor 260. In accordance with the preferred embodiment, the trusted display processor 260 is a single hardware component having the characteristics of a trusted component, providing the standard display functions of a display processor and the extra, non-standard functions for generating digital signatures and providing a trusted user interface. The skilled person will appreciate that the functions could alternatively be physically split into two or more separate physical components. However, it will be appreciated on reading the following description that integration of all functions into a single trusted component provides a most elegant and convenient solution.

According to FIG. 3, the trusted display processor 260 comprises:

a microcontroller 300;

non-volatile memory 305, for example flash memory, containing respective control program instructions (i.e. firmware) for controlling the operation of the microcontroller 300 (alternatively, the trusted display processor 260 could be embodied in an ASIC, which would typically provide greater performance and cost efficiency in mass production, but would generally be more expensive to develop and less flexible);

an interface 310 for connecting the trusted display processor 260 to the PCI bus for receiving image data (i.e. graphics primitives) from the CPU 200 and also trusted image data from the smartcard 122, as will be described;

frame buffer memory 315, which comprises sufficient VRAM (video RAM) in which to store at least one full image frame (a typical frame buffer memory 315 is 1-2 Mbytes in size, for screen resolutions of 1280×768 supporting up to 16.7 million colours);

a video DAC (digital to analogue converter) 320 for converting pixmap data into analogue signals for driving the (analogue) VDU 105, which connects to the video DAC 320 via a video interface 325;

an interface 330 for receiving signals directly from the trusted switch 135;

volatile memory 335, for example DRAM (dynamic RAM) or more expensive SRAM (static RAM), for storing state information, particularly received cryptographic keys, and for providing a work area for the microcontroller 300;

a cryptographic processor 340, comprising hardware cryptographic accelerators and/or software, arranged to provide the trusted display processor 260 with a cryptographic identity and to provide authenticity, integrity and confidentiality, guard against replay attacks, make digital signatures, and use digital certificates, as will be described in more detail below; and non-volatile memory 345, for example flash memory, for storing an identifier $I_{DP}$ of the trusted display processor 260 (for example a simple text string name), a private key $S_{DP}$ of the trusted display processor 260, a certificate $Cert_{DP}$ signed and provided by a trusted third party certification agency, such as VeriSign Inc., which binds the trusted display processor 260 with a signature public-private key pair and a confidentiality public-private key pair and includes the corresponding public keys of the trusted display processor 260.

A certificate typically contains such information, but not the public key of the CA. That public key is typically made available using a 'Public Key Infrastructure' (PKI). Operation of a PKI is well known to those skilled in the art of security.

The certificate $Cert_{DP}$ is used to supply the public key of the trusted display processor 260 to third parties in such a way that third parties are confident of the source of the public key and that the public key is a part of a valid public-private key pair. As such, it is unnecessary for a third party to have prior knowledge of, or to need to acquire, the public key of the trusted display processor 260.

The trusted display processor 260 lends its identity and trusted processes to the host computer and the trusted display processor has those properties by virtue of its tamper-resistance, resistance to forgery, and resistance to counterfeiting. Only selected entities with appropriate authentication mechanisms are able to influence the processes running inside the trusted display processor 260. Neither an ordinary user of the host computer, nor any ordinary user or any ordinary entity connected via a network to the host computer may access or interfere with the processes running inside the trusted display processor 260. The trusted display processor 260 has the property of being "inviolate".

Originally, the trusted display processor 260 is initialised with its identity, private key and certificate by secure communication with the trusted display processor 260 after it is installed onto the motherboard of the host computer 100. The method of writing the certificate to the trusted display processor 260 is analogous to the method used to initialise smartcards by writing private keys thereto. The secure communications is supported by a 'master key', known only to the trusted third party (and to the manufacturer of the host computer 100), that is written to the trusted display processor 260 during manufacture, and used to enable the writing of data to the trusted display processor 260. Thus, writing of data to the trusted display processor 260 without knowledge of the master key is not possible.

It will be apparent from FIG. 3 that the frame buffer memory 315 is only accessible by the trusted display processor 260 itself, and not by the CPU 200. This is an important feature of the preferred embodiment, since it is imperative that the CPU 200, or, more importantly, subversive application programs or viruses, cannot modify the pixmap during a trusted operation. Of course, it would be feasible to provide the same level of security even if the CPU 200 could directly access the frame buffer memory 315, as long as the trusted display processor 260 were arranged to have ultimate control over when the CPU 200 could access the frame buffer memory 315. Obviously, this latter scheme would be more difficult to implement.

A typical process by which graphics primitives are generated by a host computer 100 will now be described by way of background. Initially, an application program, which wishes to display a particular image, makes an appropriate call, via a graphical API (application programming interface), to the operating system. An API typically provides a standard interface for an application program to access specific underlying display functions, such as provided by Windows NT™, for the purposes of displaying an image. The API call causes the operating system to make respective graphics driver library routine calls, which result in the generation of graphics primitives specific to a display processor, which in this case is the trusted display processor 260. These graphics primitives are finally passed by the CPU 200 to the trusted display processor 260. Example graphics primitives might be 'draw a line from point x to point y with thickness z' or 'fill an area bounded by points w, x, y and z with a colour a'.

The control program of the microcontroller 300 controls the microcontroller to provide the standard display functions to process the received graphics primitives, specifically:

receiving from the CPU 200 and processing graphics primitives to form pixmap data which is directly representative of an image to be displayed on the VDU 105 screen, where the pixmap data generally includes intensity values for each of the red, green and blue dots of each addressable pixel on the VDU 105 screen;

storing the pixmap data into the frame buffer memory 315; and periodically, for example sixty times a second, reading the pixmap data from the frame buffer memory 315, converting the data into analogue signals using the video DAC and transmitting the analogue signals to the VDU 105 to display the required image on the screen.

Apart from the standard display functions, the control program includes a function to mix display image data deceived from the CPU 200 with trusted image data to form a single pixmap. The control program also manages interaction with the cryptographic processor and the trusted switch 135.

The trusted display processor 260 forms a part of the overall 'display system' of the host computer 100; the other parts typically being display functions of the operating system, which can be 'called' by application programs and which access the standard display functions of the graphics processor, and the VDU 105. In other words, the 'display system' of a host computer 100 comprises every piece of hardware or functionality which is concerned with displaying an image.

Figure 4:
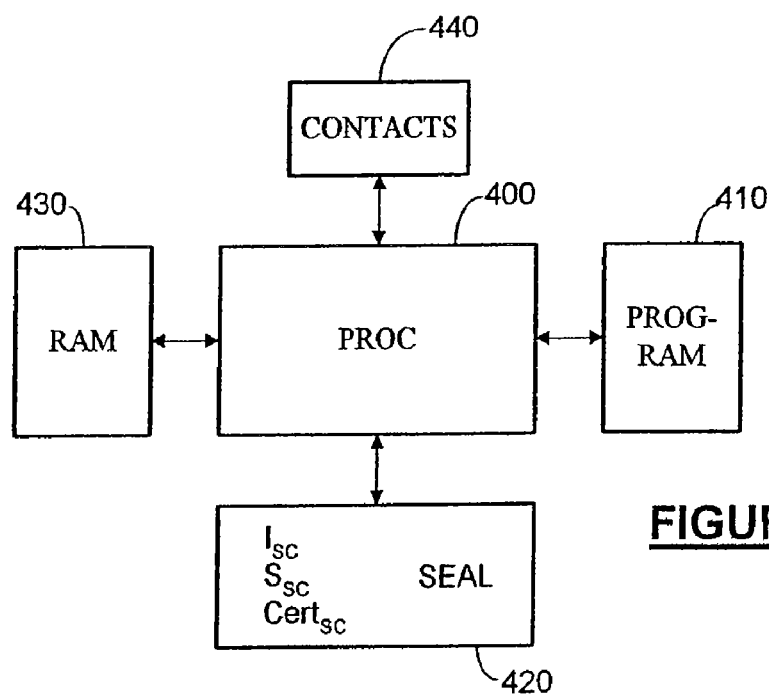
FIG. 4 is a diagram which illustrates a hardware architecture of a smart card processing engine suitable for operating in accordance with the preferred embodiment of the present invention.

As already mentioned, the present embodiment relies on interaction between the trusted display processor 260 and the user's smartcard 122. The processing engine of a smartcard suitable for use in accordance with the preferred embodiment is illustrated in FIG. 4. The processing engine comprises a processor 400 for enacting standard encryption and decryption functions, to support digital signing of data and verification of signatures received from elsewhere. In the present embodiment, the processor 400 is an 8-bit microcontroller, which has a built-in operating system and is arranged to communicate with the outside world via asynchronous protocols specified through ISO 7816-3, 4, T=0, T=1 and T=14 standards. The smartcard also comprises non-volatile memory 420, for example flash memory, containing an identifier $I_{SC}$ of the smartcard 122, a private key $S_{SC}$, used for digitally signing data, and a certificate $Cert_{SC}$, provided by a trusted third party certification agency, which binds the smartcard with public-private key pairs and includes the corresponding public keys of the smartcard 122 (the same in nature to the certificate $Cert_{DP}$ of the trusted display processor 260). Further, the smartcard contains 'seal' data SEAL in the non-volatile memory 420, which can be represented graphically by the trusted display processor 260 to indicate to the user that a process is operating securely with the user's smartcard, as will be described in detail below. In the present embodiment, the seal data SEAL is in the form of an image pixmap, which was originally selected by the user as a unique identifier, for example an image of the user himself, and loaded into the smartcard 122 using well-known techniques. The processor 400 also has access to volatile memory 430, for example RAM, for storing state information (such as received keys) and providing a working area for the processor 400, and an interface 440, for example electrical contacts, for communicating with a smart card reader.

Seal images can consume relatively large amounts of memory if stored as pixmaps. This may be a distinct disadvantage in circumstances where the image needs to be stored on a smartcard 122, where memory capacity is relatively limited. The memory requirement may be reduced by a number of different techniques. For example, the seal image could comprise: a compressed image, which can be decompressed by the trusted display processor 260; a thumb-nail image that forms the primitive element of a repeating mosaic generated by the trusted display processor 260; a naturally compressed image, such as a set of alphanumeric characters, which can be displayed by the trusted display processor 260 as a single large image, or used as a thumb-nail image as above. In any of these alternatives, the seal data itself may be in encrypted form and require the trusted display processor 260 to decrypt the data before it can be displayed. Alternatively, the seal data may be an encrypted index, which identifies one of a number of possible images stored by the host computer 100 or a network server. In this case, the index would be fetched by the trusted display processor 260 across a secure channel and decrypted in order to retrieve and display the correct image. Further, the seal data could comprise instructions (for example PostScript™ instructions) that could be interpreted by an appropriately programmed trusted display processor 260 to generate an image.

Figure 5:
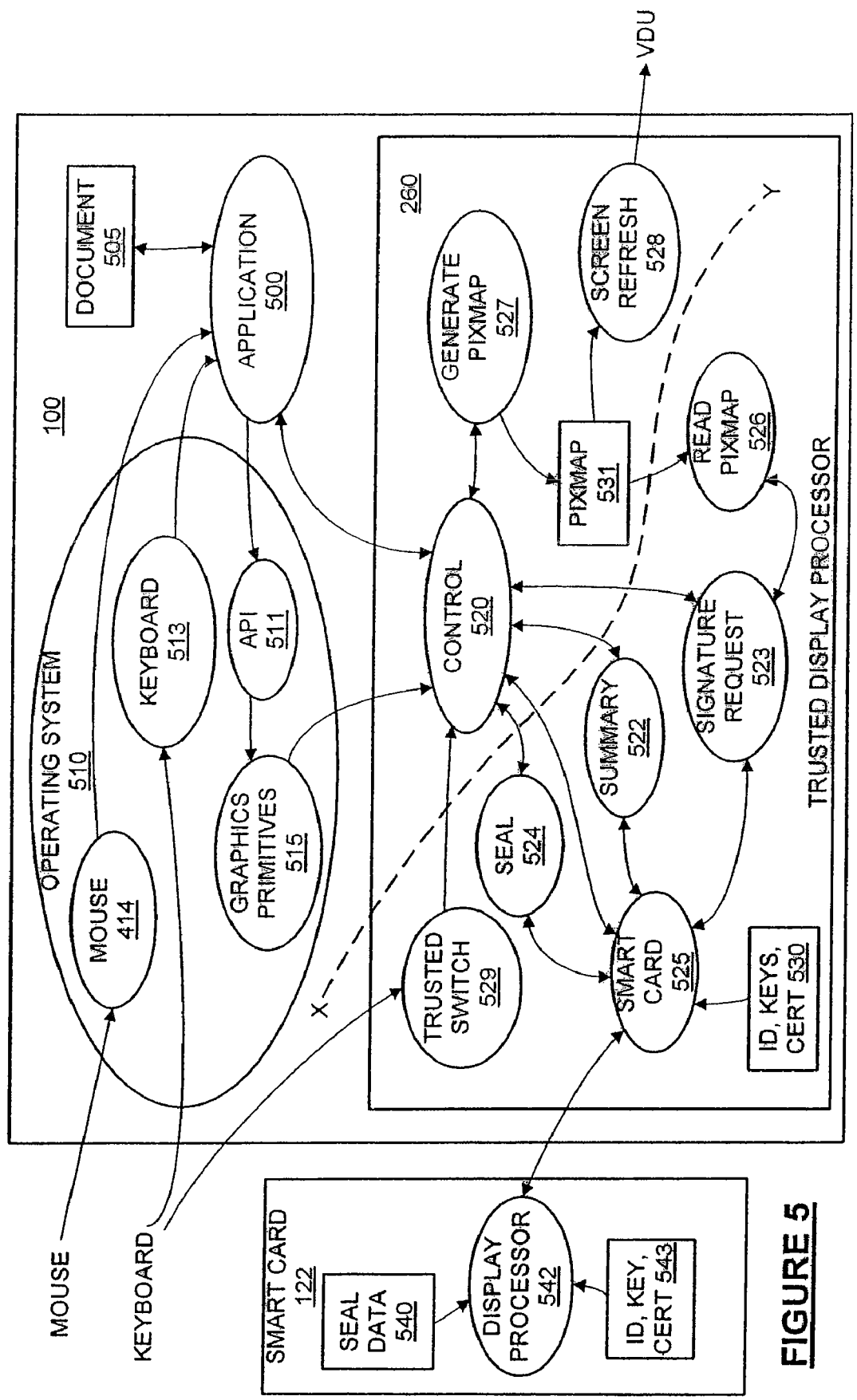
FIG. 5 is a diagram which illustrates a functional architecture of a host computer including a trusted display processor and a smart card suitable for operating in accordance with the preferred embodiment of the present invention.

FIG. 5 shows the logical relationship between the functions of the host computer 100, the trusted display processor 260 and the smartcard 122, in the context of enacting a trusted signing operation. Apart from logical separation into host computer 100, trusted display processor 260 or smartcard 122 functions, the functions are represented independently of the physical architecture, in order to provide a clear representation of the processes which take part in a trusted signing operation. In addition, the 'standard display functions' are partitioned from the trusted functions by a line x-y, where functions to the left of the line are specifically trusted functions. In the diagram, functions are represented in ovals, and the 'permanent' data (including the document image for the duration of the signing process), on which the functions act, are shown in boxes. Dynamic data, such as state data or received cryptographic keys are not illustrated, purely for reasons of clarity. Arrows between ovals and between ovals and boxes represent respective logical communications paths.

In accordance with FIG. 5, the host computer 100 includes: an application process 500, for example a wordprocessor process, which requests the signing of a document; document data 505; an operating system process 510; an API 511 process for receiving display calls from the application process 500; a keyboard process 513 for providing input from the keyboard 110 to the application process 500; a mouse process 514 for providing input from the mouse 115 to the application process 500; and a graphics primitives process 515 for generating graphics primitives on the basis of calls received from the application process via the API 511 process. The API process 511, the keyboard process 513, the mouse process 514 and the graphics primitives process 515 are build on top of the operating system process 510 and communicate with the application process via the operating system process 510.

The remaining functions of the host computer 100 are those provided by the trusted display processor 260. These functions are: a control process 520 for coordinating all the operations of the trusted display processor 260, and for receiving graphics primitives from the graphics primitives process and signature requests from the application process 500; a summary process 522 for generating a signed summary representative of a document signing procedure in response to a request from the control process 520; a signature request process 523 for acquiring a digital signature of the pixmap from the smartcard 122; a seal process 524 for retrieving seal data 540 from the smartcard 122; a smartcard process 525 for interacting with the smartcard 122 in order to enact challenge/response and data signing tasks required by the summary process 522, the signature request process 523 and the seal process 524; a read pixmap process 526 for reading stored pixmap data 531 and passing it to the signature request process 523 when requested to do so by the signature request process 523; a generate pixmap process 527 for generating the pixmap data 531 on the basis of graphics primitives and seal image data received from the control process 520; a screen refresh process 528 for reading the pixmap data, converting it into analogue signals and transmitting the signals to the VDU 105; and a trusted switch process 529 for monitoring whether the trusted switch 135 has been activated by the user. The smartcard process 52 has access to the trusted display processor's identity data $I_{DP}$, private key $S_{DP}$ data and certificate $Cert_{DP}$ data 530. In practice, the smart card and the trusted display processor interact with one another via standard operating system calls.

The smartcard 122 has: seal data 540; a display processor process 542 for interacting with the trusted display processor 260 to enact challenge/response and data signing tasks; smartcard identity data $I_{SC}$, smartcard private key data $S_{SC}$ and smartcard certificate data $Cert_{SC}$ 543.

Figure 6:
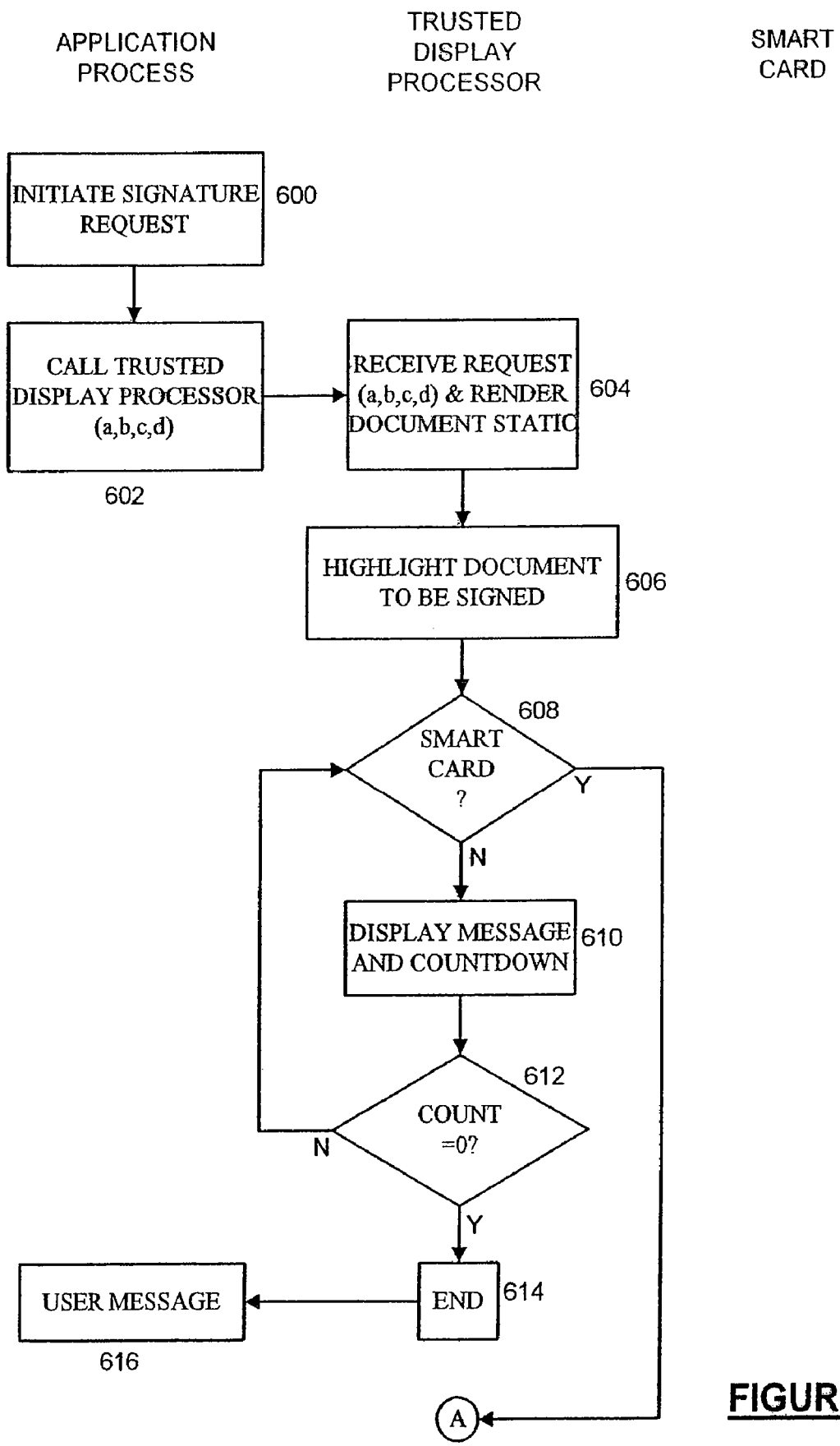
FIG. 6 is a flow diagram which illustrates the steps involved in generating an individual signature of a document.
Figure 6:
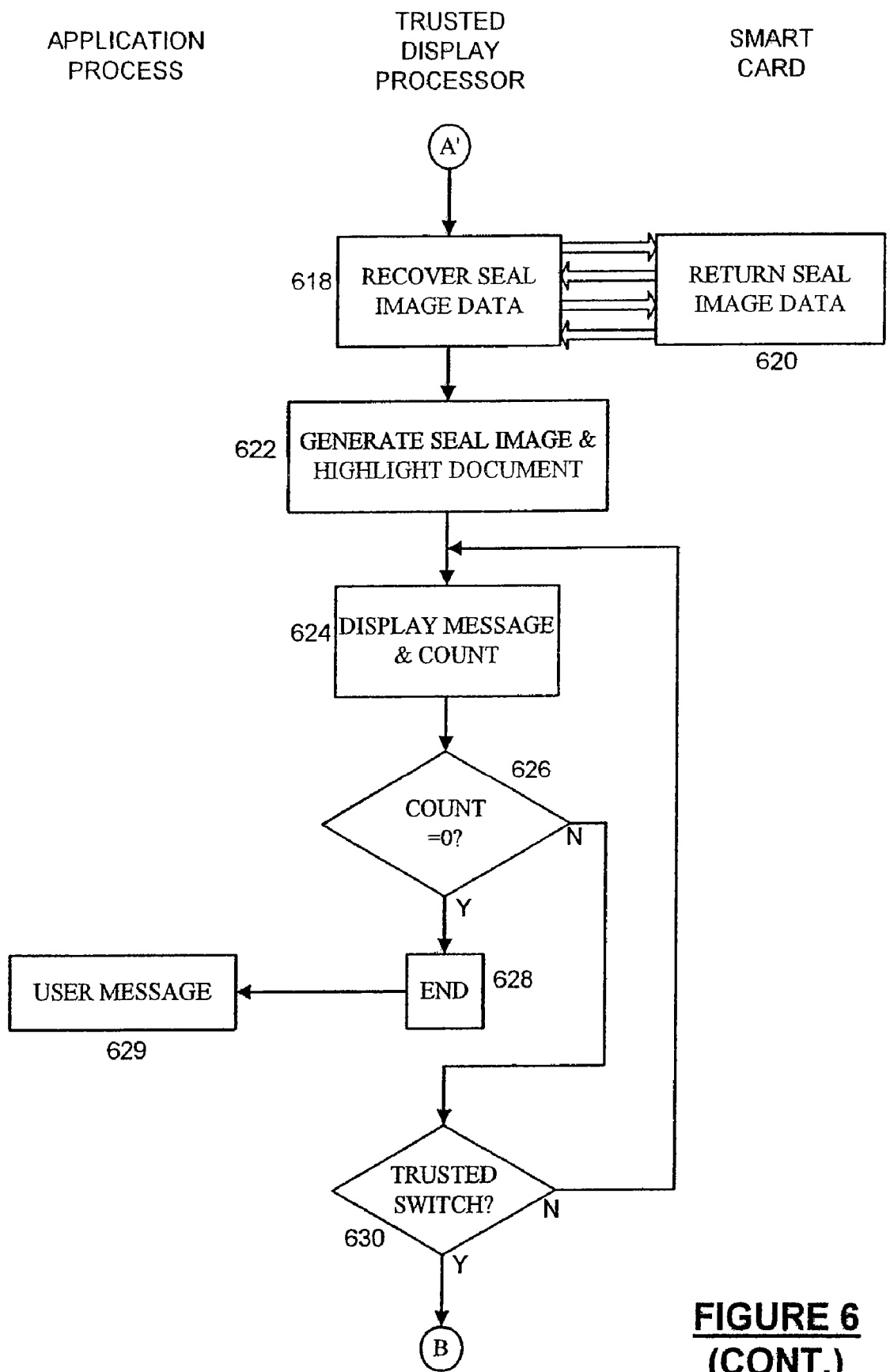
Figure 6:
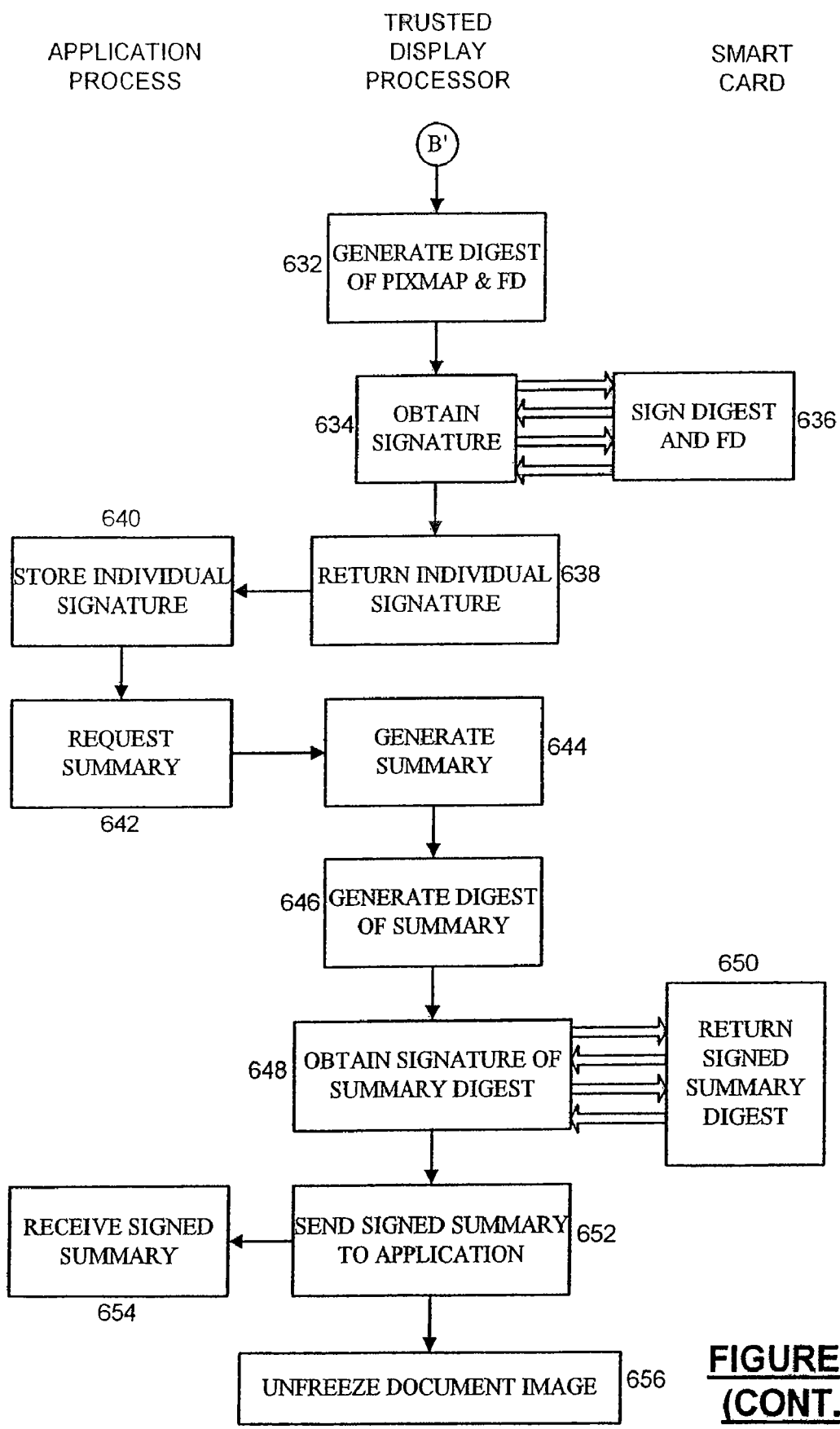

A preferred process for signing a document using the arrangement shown in FIGS. 1 to 5 will now be described with reference to the flow diagram in FIG. 6.

Initially, in step 600, the user controls the application process 500 to initiate a 'signature request' for digitally signing a document. The application process 500 may be realised as a dedicated software program or may be an addition, for example a macro, to a standard word processing package such as Microsoft's Word. In either case, neither the signature request nor the application process 500 need to be secure. When the user initiates the signature request, he also specifies the document to be signed, if it is not one which is already filling the whole screen. For example, the document may be displayed across a part of the full screen area or in a particular window. Selection of a particular area on screen is a simple task, which may be achieved in several ways (using a WIMP environment), for example by drawing a user-defined box bounding the area or by simply specifying co-ordinates.

Next, in step 602, the application process 500 calls the control process 520 to sign the image that is being displayed (within a defined area or window) on the screen; the control process 520 receives the call. In parallel, although it is not shown, the control process 520 receives any graphics primitives from the graphics primitives process and forwards them onto the generate pixmap process 527. The call from the application process 500 to sign a document includes the co-ordinates (a,b,c,d) of the edges of the document. Note that this sending of co-ordinates generally enables the signing of the entire surface of the screen, a complete window, or of an arbitrary part of the screen. The application process 500 then waits for the control process 520 to return the signature of the image.

In response to the signature-request, in step 604, the control process 520 forces the image that is to be signed to be 'static' from the time of the request until the process has been completed. Herein, 'static' means that the document image cannot be modified other than by the trusted display processor 260. This is so that the user can be certain that what he sees is what he is signing at all times during the process. In the present embodiment, the control process 520 achieves a 'static' display by 'holding-off', or not processing, any further graphics primitives. In some situations, the graphics primitives process (or equivalent) may 'buffer' graphics primitives until the control process 520 is ready to receive further graphics primitives. In other situations, graphics primitives for the image to be signed may simply be lost. Where the document image fills the whole screen, making the image static is simply a case not processing any graphics primitives. However, where the image to be signed forms only a subset, for example a window, of the full screen, the control process 520 needs to determine whether received graphics primitives would affect the 'static' area, and reject ones that would. As such, the pixmap of the static document image in the frame buffer memory 315 remains unchanged by any instructions from the graphics primitives process, or any other process executing on the CPU 200, while the document image is static.

Once the document image has been made static, in step 606, the control process 520 instructs the generate pixmap process 527, including in the call the co-ordinates (a,b,c,d) provided by the application process 500, to modify the pixmap to highlight the document to be signed, as will be described in more detail below with reference to FIG. 10c. Then, in step 608, if a smartcard 122 is not already inserted in the smartcard 122 reader 120, as determined by the smart card process 525, the control process 520 instructs the generate pixmap process to display a graphical message asking the user to insert his smartcard 122. This message is accompanied by a ten second countdown timer COUNT. If the countdown timer expires (i.e. reaches zero), as a result of not receiving the smartcard 122, the control process cancels the signing operation in step 614 and returns an exception signal to the application process 500. In response, the application process 500 displays an appropriate user message in step 616. If the smartcard 122 is inserted in time, or is already present, then the process continues.

Next, in step 618, the control process 520 calls the seal process 524, and the seal process 524 calls the smartcard process 525, to recover the seal data 540 from the smartcard 122. Optionally, the control process 520 calls the generate pixmap process 527 to display another message indicating to the user that recovery of the seal data 540 is being attempted. In steps 618 and 620, the smartcard process 525 of the trusted display processor 260 and the display processor process 542 of the smartcard 122 interact using well known, 'challenge/response' techniques to enact mutual authentication and pass the seal data 540 from the smartcard and back to the control process 520. The details of the mutual authentication process and passing of the seal data 540 will now be described with reference to FIG. 7.

Figure 7:
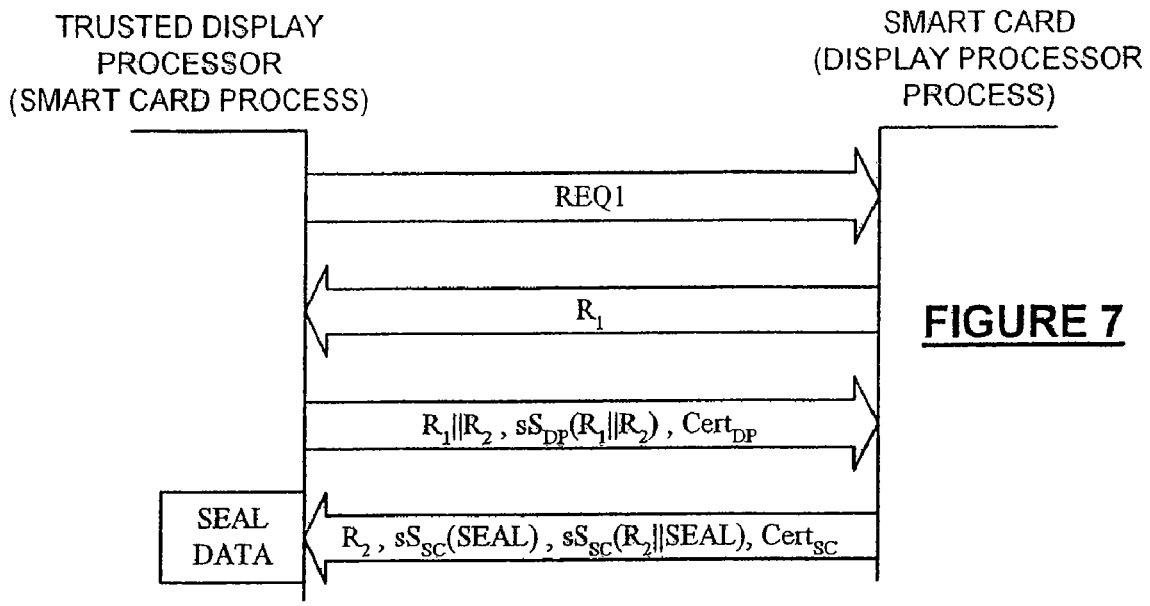
FIG. 7 is diagram which illustrates the sequence of messages between the trusted display processor and the smart card in order to recover seal image data from the smart card.

According to FIG. 7, the smartcard process 525 sends a request REQ1 to the smartcard 122 to return the seal data SEAL 540. The display processor process 542 generates a nonce $R_1$ and sends it in a challenge to the smartcard process 525. The smartcard process 525 generates a nonce $R_2$ and concatenates it with nonce $R_1$, signs the concatenation $R_1 \| R_2$ with its private key to produce a signature $sS_{DP}(R_1 \| R_2)$, and returns the concatenation $R_1 \| R_2$, the signature $sS_{DP}(R_1 \| R_2)$ and the certificate $Cert_{DP}$ back to the display processor process 542 of the smartcard 122. The display processor process 542 extracts the public key of the trusted display processor 260 from the certificate $Cert_{DP}$, and uses this to authenticate the nonce $R_1$ and the signature $sS_{DP}(R_1 \| R_2)$ by comparison with the concatenation $R_1 \| R_2$, to prove that the seal request came from the expected trusted display processor 260 and that the trusted display processor 260 is online.

The nonces are used to protect the user from deception caused by replay of old but genuine signatures (called a 'replay attack') by untrustworthy processes.

The display processor process 542 of the smartcard 122 then concatenates $R_2$ with its seal data SEAL 540, signs the concatenation $R_2 \| SEAL$ using its private key $S_{SC}$ to produce a signature $sS_{SC}(R_2 \| SEAL)$, encrypts the seal data SEAL 540 using its private key $S_{SC}$ to produce encrypted seal data 540 $sS_{SC}(SEAL)$, and sends nonce $R_2$, the encrypted seal data $sS_{SC}(SEAL)$, the signature $sS_{SC}(R_2 \| SEAL)$ and the smartcard's certificate $Cert_{SC}$ to the smartcard process 525 of the trusted display processor 260. The smartcard process 525 extracts the smartcard's public key from the certificate $Cert_{SC}$ and uses this to verify nonce $R_2$ and the signature $sS_{SC}(R_2 \| SEAL)$, decrypt the seal data SEAL 540 from the encrypted seal data 540 $sS_{SC}(SEAL)$ and, finally, return the seal data SEAL 540, via the seal process 524, to the control process 520.

Returning to FIG. 6, in step 622, when the control process 520 receives the seal data SEAL 540, it forwards the data to the generate pixmap process 527, and instructs the generate pixmap process 527 to generate a seal image and use it to highlight the document to be signed, as will be described below with reference to FIG. 10d. Then, in step 624, the control process 520 instructs the generate pixmap process 527 to display a message to the user asking whether they wish to continue with the signing operation. This message is accompanied by a ten second countdown timer COUNT. If the countdown timer expires, in step 626, as a result of not receiving a response from the user, the control process cancels the signing operation, in step 628, and returns an exception signal to the application process 500. In response, the application process 500 displays an appropriate user message in step 629. If, in step 630, the user responds positively by actuating the trusted switch 135 within the ten second time limit, the process continues. The authorisation to continue could alternatively be supplied over an unreliable channel, rather than by using a trusted switch 135, or even using appropriate software routines, providing a reasonable level of authentication is used. Alternatively, it may be decided that the mere presence of an authentic smartcard may be sufficient authorisation for the signing to occur. Such an alternatives are a matter of security policy.

Next, in step 632, the control process 520 instructs the signature request process 523 to request the signing of the document image; the signature request process 523 calls the read pixmap process 526 to request return of a digest of the pixmap data of the document to be signed; and the read pixmap process 526 reads the respective pixmap data, uses a hash algorithm to generate a digest $D_{PIX}$ of the pixmap data and returns the digest to the signature request process 523. Additionally, the read pixmap process 526 generates 'display format data' FD, which includes information necessary to reconstruct the image from the pixmap data into a text-based document at a later time (FD is not essential, since the document text may not need to be reconstructed), and returns this also to the signature request process 523. For example, the display format data FD may include the number of pixels on the screen surface and their distribution, such as '1024 by 768', and the font type and size used for the text (if the document is text-based) in the document (at least some of this information may instead, or in addition, be contained in a document 'summary', as will be described below). In steps 634 and 636, the signature request process 523 interacts with the display processor process 542 of the smartcard 122 using well-known challenge/response processes to generate an individual signature of the document, as will now be described in detail with reference to the flow diagram in FIG. 8.

Figure 8:
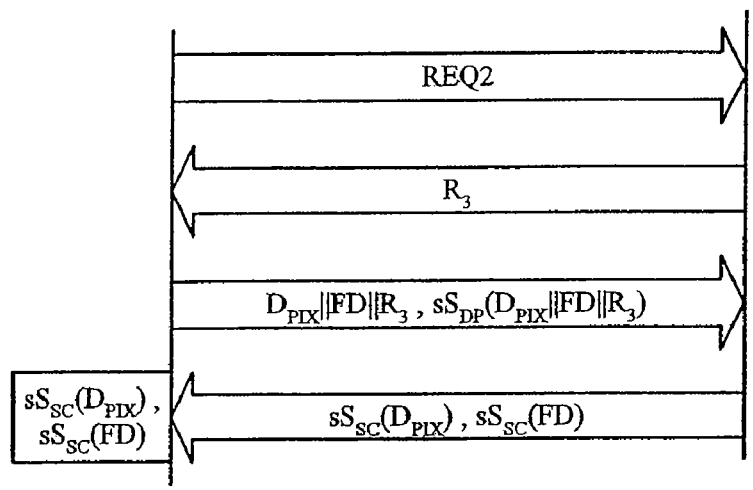
FIG. 8 is diagram which illustrates the sequence of messages between the trusted display processor and the smart card in order to generate a signature of a document Image.

According to FIG. 8, the smartcard process 525 generates a request REQ2 for the smartcard 122 to generate a signature of the digest $D_{PIX}$ and display format data FD. The display processor process 542 of the smartcard 122 responds by generating a nonce $R_3$ and sending it to the smartcard process 525 with a challenge to return the digest $D_{PIX}$ and the display format data FD. The smartcard process 525 concatenates the digest $D_{PIX}$ with the display format data FD and nonce $R_3$, and signs the concatenation $D_{PIX} \| FD \| R_3$ to produce a signature $sS_{DP}(D_{PIX} \| FD \| R_3)$. The smartcard process 525 then sends the concatenation $D_{PIX} \| FD \| R_3$ and its respective signature $sS_{DP}(D_{PIX} \| FD \| R_3)$ to the display processor process 542 of the smartcard 122. The display processor process 542 uses the trusted display processor's public key (which it has already received in the seal data 540 exchange) to verify the trusted display processor's signature $sS_{DP}(D_{PIX}\|FD\|R_3)$ and nonce $R_3$, to prove that the digest is the current image digest. The display processor process 542 signs the digest of the pixmap $D_{PIX}$ and the display format data FD, using its private key, to produce two signatures $sS_{SC}(D_{PIX})$ and $sS_{SC}(FD)$ respectively. The display processor process 542 of the smartcard then returns the signed digest $sS_{SC}(D_{PIX})$ and signed display format data $sS_{SC}(FD)$ to the smartcard process 525 of the trusted display processor 260. The smartcard process 525 next verifies the digest $D_{PIX}$ and display format data FD, using the smartcard's public key (which it already has as a result of the seal data 540 exchange), and verifies the smartcard's signature, to prove that the smartcard is still online.

Returning to FIG. 6, in step 638, the smartcard process 525 of the trusted display processor 260 concatenates the pixmap PIX, the smartcard's signed versions of the pixmap digest $sS_{SC}(D_{PIX})$ and display format data $sS_{SC}(FD)$ to form an individual signature $PIX\|sS_{SC}(D_{PIX})\|sS_{SC}(FD)$ of the image, and returns it, via the signature request process 523, to the control process 520, which returns the individual signature to the application process 500. The application process 500 stores the individual signature, in step 640, and responds with a further call to the control process 520 to 'summarise the signing' operation in step 642. The purpose of a summary is to complete the signature, as will be described with reference to the flow diagram in FIG. 9 and also the example summary below:

ate a signature of the summary digest $D_{SUM}$, as will now be described with reference to FIG. 9.

Figure 9:
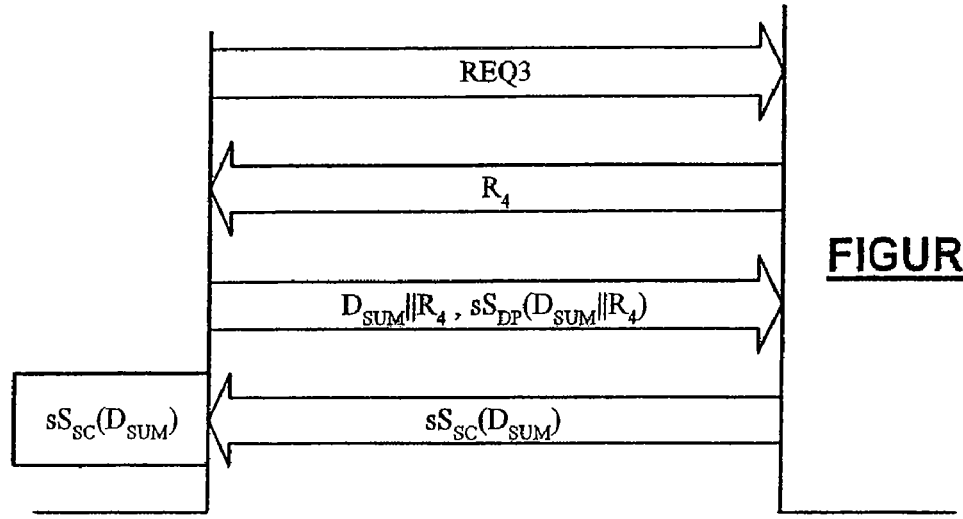
FIG. 9 is diagram which illustrates the sequence of messages between the trusted display processor and the smart card in order to generate a signature of a summary of the document image signing process.

According to FIG. 9, the smartcard process 525 generates a request REQ3 for the smartcard 122 to generate a signature of the digest of the summary $D_{SUM}$. The display processor process 542 of the smartcard generates a nonce $R_4$ and sends it in a challenge to return the digest of the summary $D_{SUM}$. The smartcard process 525 concatenates the digest $D_{SUM}$ with nonce $R_4$ and signs the concatenation $D_{SUM}\|R_4$ to produce a signature $sS_{DP}(D_{SUM}\|R_4)$. The smartcard process 525 of the trusted display processor 260 then sends the concatenation $D_{SUM}\|R_4$ and respective signature $sS_{DP}(D_{SUM}\|R_4)$ to the display processor process 542. The display processor process 542 then verifies the trusted display processor's signature and nonce $R_4$, using the trusted display processor's public key (which it already has from the seal data 540 exchange), to prove that the summary is the current summary. Next, the display processor process 542 signs the digest of the summary $D_{SUM}$ using its private key and sends the signed digest $sS_{SC}(D_{SUM})$ to the smartcard process 525. The smartcard process 525 of the trusted display processor 260 verifies the digest and verifies the smartcard's signature, using the smartcard's public key, to prove that the smartcard is still online.

Returning to FIG. 6, in step 652, the smartcard process 525 returns the summary SUM concatenated with the signed digest of the summary $sS_{SC}(D_{SUM})$ (to form concatenation $SUM\|sS_{SC}(D_{SUM})$), via the summary process 522, to the control process 520, and the control process 520 returns the

```
 1  TC-88503-00.01
 2  Access time: Thu 06-May-1999,11:18
 3  Pages: 2
 4  Image01 | 560 x 414 (187,190) [1024 x 768]
 5  -----BEGIN SIGNATURE-----
 6  PmftitUGoWZh6SLDgqQAvGZZY47Fp8wx5ZqE5HS8bGrSV3RD7LKw0kyXPY6yhGDpVNUc/R2
    +Gr4mm0LqS/twYuPdskyL4uk3no0w3LG2+f+/vzC4cKMPeY/LhbazZScvhK3CJ+apQxyikj
    cY5rTC563klovOPTBI/IyqZPxRnic=
 7  -----END SIGNATURE-----
 8  Image02 | 670 x 379 (201,228) [1024 x 768]
 9  -----BEGIN SIGNATURE-----
10  UV1w5Rgr5F0iAjvUW4GP28NKAA+tOy42uBbP78JeQ5w20MI1afTYkSNtfn9VykYMPIfZLwM
    7ZZV+4fFttuSgOZI4n5iBkSEwtEj0z6ik/np6paq+0lGQZhhJCbq8OaX97Gmdg3AoBq4x+D
    hujmqkCJO+Dz6+x8kE24Z8YFXLPOI=
11  -----END SIGNATURE-----
12  Summary signature:
13  -----BEGIN SIGNATURE-----
14  ciZDZL2+41FsFci2cPjWFsfltkyXrfHBUM1kAEyudaZcVxD3XczTN7txSazInM2deJL9qnA
    een2DW1ZGjp1EESNkhoZXj0kT5TYNv2ylYFk0lSN+JVF09bmc9GdYLo/hSOWyYG/U29Mzqz
    ktaTdTqY/gPh1GajrSJGqRms+we/c=
15  -----END SIGNATURE-----
```

In step 644, the control process 520 calls the summary process 522 to generate a summary message SUM containing the number of images (two in the example summary above) plus the individual signatures of the images (lines 6 and 10 of the example), a label identifying the trusted display device (line 1 in the example), the current time and date (line 2 in the example) and a signed digest of the summary itself (line 14 in the example). For each image, the summary also includes the size of the image in pixels (e.g. 560×414 for image 1), the offset from the origin of the screen in pixels (e.g. 187, 190 for image 1) and the display resolution in pixels (e.g. 1024×768 for image 1).

The summary process 522 then generates a digest of the summary $D_{SUM}$ in step 646 and calls the smartcard process 525 of the trusted display processor 260 to interact with the smartcard 122 using challenge/response processes to genersummary $SUM\|sS_{SC}(D_{SUM})$ to the application process 500. The application process 500 receives the summary in step 654.

The individual signature and summary may be used by the application process 500, or any other process running on the host computer 100 in various ways outside the scope of this invention, including as proof of contract, for storage or for transmission to other entities.

Finally, in step 656, the control process 520 unfreezes the display, by recommencing receipt and processing of graphic primitives associated with the document image, and thereby in effect returns control of the display back to the application process 500 or others application software. Alternatively, control may not be handed back to the application process 500 until the user actuates the trusted switch 135 again, typically in response to another user message, which, this time, would not have a timeout period. This would give the user more time to review the static document image before returning the host computer to standard, non-trusted operation.

In order to verify a signed document, both the individual signature $PIX \| sS_{SC}(D_{PIX}) \| sS_{SC}(FD)$ and the summary $SUM \| sS_{SC}(D_{SUM})$ must be verified. Such verification methods are well known to those skilled in the art of security. For example, the signature on the digest of the pixmap $sS_{SC}(D_{PIX})$ is verified using the public key of the user, which is publicly available and preferably contained within a digital certificate $Cert_{SC}$ supplied by a certification authority. The verified digest is then compared with a value obtained by re-computing the digest from the pixmap, where the digest is generated using a standard, well-known and defined hash function. If the match is exact, the signature has been verified. Other signatures, including the summary, are checked in the same way.

A preferred method of enabling a person to verify the wording of the signed document is to translate the pixmap back into an image. This requires an application, or indeed a trusted display processor 260, to load the pixmap data PIX into the frame buffer memory 315 of a respective host computer 100. This allows a person to view the document hat the signer has signed.

The stages of highlighting a document to be signed will now be described with reference to FIGS. 10a to 10d.

In the preferred embodiment, the seal data SEAL comprises a pixmap of a trusted image. For example, as shown in FIG. 10a, the pixmap of the seal data 540 defines a 'smiley face' 1000. FIG. 10b illustrates an image 1005 of an exemplary document Doc1 to be signed, in a window 1010 of the screen (not shown). As a first highlighting step, after the image has been made static but before the seal data has been received, the trusted display processor 260 highlights the document to be signed by superimposing a frame 1020 around the document image 1005, as illustrated in FIG. 10c. Also, where a smartcard 122 is not present, a user message 1030 asking the user to insert his smartcard is displayed accompanied by a ten second countdown timer 1035, as also illustrated in FIG. 10c. Next, when the smiley face pixmap image is retrieved from the smartcard 122, the trusted display processor 260 embellishes the frame 1040 with multiple instances 1045, or a mosaic, of the smiley face, as shown in FIG. 10d. In addition, as shown in FIG. 10d, the trusted display processor 260 generates a further user message 1050, accompanied by a ten second countdown timer 1055, asking the user whether they wish to proceed with the signing process. This embellished frame 1040 both indicates to the user that the correct static image area is being acted on and provides the user with a high level of confidence that the trusted display processor 260 is fully in control of the signing process; the presence of the user's own seal image provides confidence to the user that the message has come from the trusted display processor 260 rather than from some other (possibly subversive) software application or hardware device.

Figure 10E:
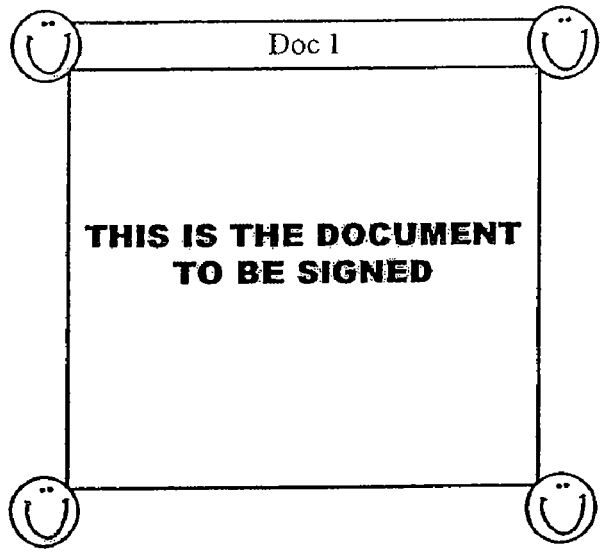
FIGS. 10*e* to 10*g* are diagrams which illustrate alternative ways of highlighting the image of a document to be signed.
Figure 10F:
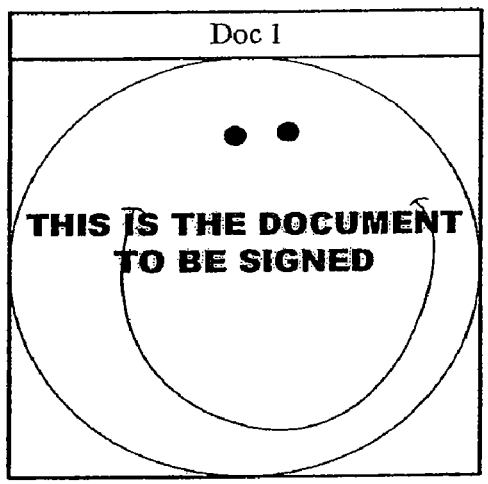
Figure 10G:
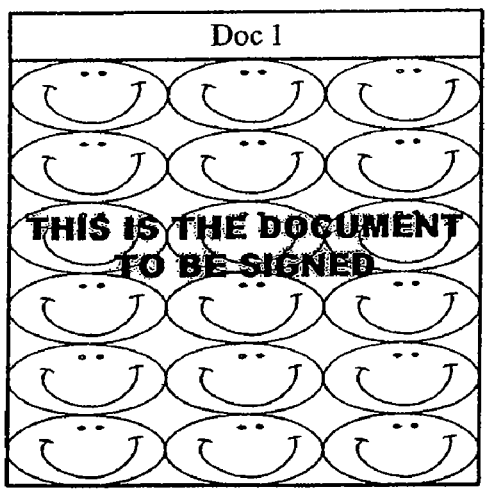

FIGS. 10e and 10g illustrate alternatives to the 'frame' visual effect illustrated in FIGS. 10c and 10d. In FIG. 10e, four single seal images 1060 are positioned at the corners of the static document image using the co-ordinates provided by the application process 500, to define the static image area. In FIG. 10f, the static image is defined by modifying the background thereof to show a single seal image. In FIG. 10g, the static image is defined by modifying the background thereof to show a mosaic of seal images. It is expected that the skilled reader will be able to think of other visual effects by which the static image may be highlighted in the light of the present description. In addition, it may be desirable to include further status messages during the signing operation, for example "Retrieving seal data 540 now . . . ", "Generating document signature now . . . ", etc.

It will be appreciated that the trusted display processor 260 needs to be able to display the seal image(s) and the messages in the correct places on screen. Clearly, the seal image and the message images are temporary, to the extent they appear during the signature process and disappear thereafter. There are well-known, standard display techniques for overlaying a first image with a second image, thereby obscuring a part of the first image, then removing the second image and restoring the portion of the first image that had been obscured. Such techniques are used as a matter of course in normal windows environments, for example, where multiple windows may overlap one another. The trusted display processor 260 is arranged to implement one of more of these standard techniques for the purposes of superimposing the seal image(s) and the message images over the standard display.

In some scenarios, it may be that a document is too large to fit all at once onto the VDU 105 screen and still be easily read by a person. Obviously, for the present embodiment to be practical, it is essential that a user can very clearly read the document before signing it. Therefore, the document can be split into multiple screen pages, each of which needs to be signed and cryptographically chained to the signature of the previous page, as will now be described.

First, the application process 500 causes the image of the first page to be displayed and makes a call to the trusted display processor 260 for signing as before. When the trusted display processor 260 returns the individual signature, instead of requesting a summary, the application process 500 instructs the trusted display processor 260 to display the image of the second page and sign the image. Clearly, in this case, the trusted display processor 260 is arranged to support such a request by the application process 500. Only after all images have been signed and returned to the application process 500 does the application process 500 issue a request for a summary. Then, the summary includes the number of images that were signed in this multi-page document, for example as illustrated in the two-page summary above.

The first page in the multi-page document is signed in the same way as a single page, resulting in return of an individual signature. When subsequent images are presented for signing, however, the trusted display processor 260 recognises that they are part of a multi-page document because no summary request was received after the previous signature request. As a result, the trusted display processor 260 displays a different message, which requests permission from the user to sign a continuation page. In response, the user who is signing a multi-page document uses the same reliable permission channel as before (for example, the trusted switch 135) to confirm to the trusted display processor 260 that this page is associated with the previous page, and is also to be signed. When the trusted display processor 260 receives this multi-page confirmation, it concatenates the signature of the previous signed page with the pixmap of the current page, creates a digest of the concatenation, and sends that to the smartcard for signing. This is instead of sending a digest of just the current pixmap. This process cryptographically 'chains' a subsequent page to the previous page, so that pages cannot be rearranged without detection, nor can intermediate pages be inserted or deleted without detection.

The validity of the first page may be checked in exactly the same way as a single page. The validity of subsequent pages is checked using the same method as for a single page, except that the digest of the current pixmap is replaced by the digest of the concatenated previous signature and current pixmap.

It will be appreciated that there are many ways of cryptographically chaining a subsequent page to a previous page. Such ways will be obvious to those skilled in the art of security in the light of the present description.

For added security, the image of each page of a multi-page document may be arranged to include the conventional footer 'Page x of y, where 'x' is the number of the page and 'y' is the total number of pages. This enables ready detection by a person of a truncated document simply by reading the document.

A significant benefit of the present document signing scheme is that a signed document can be re-signed and countersigned. As such, it is preferable for the summary of a document to include an audit trail. There are many variations on re-signing and countersigning, although (obviously) an electronic integrity check should always be done before any further signing. At one extreme, the new signer could view, confirm and re-sign each signed image in turn, effectively replacing the original signature by a new one. This method could be used, for example, by a user signing a document prepared for him by someone else. At the other extreme, the new signer could simply 'rubber stamp' the original signature by signing the original summary, without necessarily viewing the document at all. This could be useful to a manager countersigning the work of a trusted employee.

For a re-signing operation, the application process 500 issues a re-signing request, and transmits an already signed document (plus the individual signature(s) and the summary) to the trusted display processor 260. The trusted display processor 260 verifies the signed document using the public key of the signer, recovers the pixmap of the document (or each page of the document) and displays each verified image in the correct order to the new user, as if they were original images from the signature request application. The user confirms the acceptance of each individual image, for example using a trusted switch 135 as before, and causes the images to be signed as before by a smartcard belonging to the new user. This results in a signed document that is the same as the original document, except that it has been signed by the smartcard belonging to the new user.

Similarly, for a counter-signing operation, the application process 500 issues a counter-signing request and transmits the signed document (plus individual signatures and the summary) to the trusted display processor 260. The trusted display processor 260 verifies the signed document and displays each verified image in the correct order to the new user, as if they were original images from the application process 500. The user confirms acceptance of each individual image and the trusted display processor 260 signs the original summary using the smartcard belonging to the new user. Optionally the new user could provide a certificate of the previous user's public key, signed by the new user, to ease the processing overhead associated with later verification of the signature.

Clearly, there are many possible variations on the theme of re-signing and countersigning, which will be apparent to the skilled person in the light of the present description.

Since a document may have a history of signing, re-signing and/or counter-signing, the present embodiment conveniently provides audit information, which forms part of the document summary. This audit information allows the signature history of the document to be traced. The audit information includes data about the previous state of the document and the actions taken by the new user to create the new state of the document. The audit information is signed by the trusted display processor 260, since the audit information must be independent of the user. The audit information always contains any previous summary information (including the signature on that summary information, by the previous signer). If the signed document has been created from scratch, the identity label $I_{DP}$ of the trusted display processor 260 is inserted as an audit root. The audit information preferably also includes an indication of which individual images were viewed and confirmed by the new user, and whether the document was created from scratch, or was re-signed, or was countersigned by the new user. To create a summary including audit information, the smartcard is sent a digest of the audit information concatenated with the previously described contents of a summary, rather than a digest of just the previously described contents of a summary. The rest of the process is as previously described.

An enhancement to the process for signing a document is that, prior to signing the pixmap data, the trusted display processor 260 compresses the pixmap using a lossless compression algorithm so that the overheads associated with storing and sending the individual signature are reduced.

The pixmap may be compressed by standard compression algorithms, for example a codeword-based algorithm applying LZ-1 or LZ-2 compression. Alternatively, a technique similar to OCR (optical character recognition) may be used to compress the pixmap. In this case, the situation differs from conventional OCR in that the input data has been perfectly 'scanned', albeit at a lower resolution than in conventional OCR. The OCR-compressed version of the pixmap may be generated by 'blob-matching' to create an alphabet for the pixmap, constructing a pixmap of each character in the alphabet, and constructing a message using those characters, such that the message represents the original pixmap. This means that the pixmap can been compressed to a new alphabet and a message written in that alphabet. Since there are, obviously, no errors nor ambiguity in the pixmap data, this is a lossless compression method.

Another way of reducing the size of the image pixmap is by representing the image as a pure black and white image, requiring only a single bit—set to zero or one—to define whether a pixel is black or white. Otherwise, the document image is represented as a full colour image, where each pixel may typically require up to 24-bits. Obviously, this technique may be suitable for simple, black and white text-based documents. However, it would not be appropriate for colour documents or images.

At any time, the document image may be converted back into a text-based document using an OCR-type process to reconstruct a standard digital textual representation of the document. This technique cannot be used in the signature, since the textual mapping may be incorrect, but can be used by the receiver of a signed document to convert it back into a standard digital textual representation (such as ASCII) for subsequent machine manipulation. In preferred embodiments, the trusted display processor 260 is equipped to enact OCR document recovery.

To enact OCR, an OCR alphabet is generated in a standard fashion and is then matched to stored fonts and hence converted to a standard character set. As in conventional OCR, ambiguous matches may be retained as a pixmap and flagged for conversion by the user. (This is unlikely, particularly if font type and size information has been supplied in the display format data FD, because there is no error in the data.) In cases of extreme caution, the entire reconstructed document should be manually checked by a person against the view of the document that the signer intended to sign.

Preferably all document reconstruction processes are done by processes that are rusted.

The preferred embodiment described above relies on the premise that the trusted display processor 260 has direct and exclusive access to video data stored in the frame buffer memory 315, beyond the point where the video data can be manipulated by host computer 100 software, including the operating system. This implies that the video data cannot be modified unless the trusted display processor 260 makes the modification.

It will be appreciated that not all computer architectures are arranged in this way. For example, some computer architectures are arranged such that the frame buffer memory forms a part of the main memory, thus forming a single address space (SAS) display system. One benefit of such a system is that both the CPU and the display processor can access the frame buffer memory and share the graphics operation overhead, thereby improving graphics performance. Clearly, an implementation of the present invention in such a SAS system cannot rely on the premise that the buffer memory is safe during signing, since the CPU can still access the memory. However, there are many ways in which such a SAS system may be modified to support implementations of the present invention. For example, the memory could be provided with a control line from a trusted display processor such that, during a signing operation, the memory is prevented from being updated by data from the CPU. The memory devices themselves are preferably modified so that they include the extra logic to perform this function. Alternatively, access to memory is blocked by other logic circuits inserted into the normal control path of the memory. Such systems, therefore, rely on the modified premise that the video data in the frame buffer memory can only be modified, other than by the trusted display processor, with the permission of the trusted display processor. Clearly, this premise is as valid for secure operation as the first premise, as long as the system is truly secure.

In other architectures, for example in simple graphics environments, the functionality of a display processor may form part of the operating system itself, thereby removing the requirement for separate display processor hardware. Clearly, in this case, the graphics overhead put on the CPU will be higher than in a system with separate display processor hardware, thereby limiting the graphics performance of the platform. Clearly, there is then no place for a 'trusted display processor' as such. However, it will be apparent to the skilled person that the same function as provided by the trusted display processor, that of protecting the frame buffer memory and interacting with a smartcard, can be implemented using an appropriate trusted component, which controls the display system (in whatever form) during signing.

In other embodiments of the invention, the functionality of trusted switch 135 may be replaced by software. When the trusted switch process 529 is activated (as in step 630), instead of waiting for operation of a dedicated switch, the trusted component 260 uses its random number generation capability to generate a nonce in the form of a textual string. This textual string is then displayed on the trusted display in a message of the form "Please enter <textual string> to confirm the action>. To confirm the action, the user must then enter the given textual string, using the keyboard 110. As the textual string will be different every time, and because no other software has access to this textual string (it passes only between the trusted processor 300 and the display), it will not be possible for malicious software to subvert this confirmation process.

In other embodiments of the invention, in addition or alternatively, the trusted display processor (or equivalent) includes an interface for driving a trusted display. The trusted display might be, for example, an LCD panel display. In the same way that the trusted switch provides a trusted means for a user to interact with the trusted display processor, the trusted display can provide a trusted means for feeding back information to the user other than via the standard VDU. For example, the trusted display might be used to provide user status messages, as described above, relating to a signing operation. As such, applications running on the standard host computer should not be able to access the trusted display, because the display is connected either directly to the trusted display processor or via some form of trusted channel. In essence, such a trusted display is an addition to the so-called 'trusted interface' described above. In practice, there is no reason why other forms of trusted feedback device, of which the trusted display is one example, could not be included in addition, or as an alternative. For example, there may be scenarios where some form of trusted sound device would be useful for providing audible feedback.

An alternative application for the invention is to provide a trusted interface during an electronic transaction. In one exemplary embodiment, the user wishes to send sensitive data to a remote computer system. The user cannot be sure that the remote computer system, or indeed the host computer he is using, is trustworthy. In order to ensure that the sensitive data is safe from interception by unauthorised parties during transmission to the remote computer system, and to ensure that only the authentic remote computer system can read the sensitive data when it is received, the user wishes to encrypt the data using the authentic remote computer system's public cryptographic key. In the embodiment, the host computer incorporates a trusted component, which interacts with the user's smart card in order to recover and display a trusted image as described in detail above. The trusted image may be displayed on the standard VDU screen or on a separate display, such as an LCD display, in order to indicate to the user that the trusted component, rather than a subversive application, is in control. The trusted component then interacts with the remote computer system in order to recover and authenticate the remote computer system's certificate containing a respective public key. With the public key, the trusted component encrypts the sensitive data, which might itself also be read from the smartcard, and transmits the encrypted data to the remote computer system.

There are many other applications, especially e-commerce applications, where the concept of a trusted user interface, providing trusted user feedback and trusted user input device (s), would be valuable. As such, the present invention should not be read as being limited to the few embodiments described above, and should only be limited by the language of the claims.

The invention claimed is:

1. A data processing system capable of operating in a trusted operating mode, the data processing system comprising:
   main processing means for executing at least one application process and for generating signals characterising a main image to be displayed;
   a trusted component comprising means for executing a trusted process in a trusted operating mode;
   display processing means for receiving said signals and generating respective display signals for driving a visual display unit to display the main image,
   wherein the trusted component comprises means to acquire and/or generate trusted image data and means to control the display processing means to combine a respective trusted image with at least a portion of the main image in order to indicate to a user that the data processing system is operating in the trusted operating mode.

2. A data processing system according to claim 1, wherein the display processing means comprises:
frame buffer memory;
a pixel generator to generate pixel data representative of the main image on the basis of the signals received from the main processing means;
a frame buffer refresher to update the pixel data in the frame buffer memory; and
a video controller to repeatedly read the pixel data from the frame buffer memory, generate signals suitable for driving the visual display unit and transmit said signals to the visual display unit to display the image,
and wherein the trusted component comprises means to write the trusted image data, or data derived from the trusted image data, to at least a portion of the frame buffer memory in order to combine the further image with the main image.

3. A data processing system according to claim 1, wherein the trusted component and the user feedback processing means are embodied in a single application-specific integrated circuit or as an appropriately programmed microcontroller.

4. A data processing system capable of operating in a trusted operating mode, the data processing system comprising:
main processing means for executing at least one application process and for generating signals characterising a main image to be displayed;
a secure token reader for reading data from and/or writing data to a removable secure token;
a trusted component comprising means for executing a trusted process in a trusted operating mode;
display processing means for receiving said signals and generating respective display signals for driving a visual display unit to display the main image,
wherein the trusted component comprises means to acquire data characterising a trusted image from a secure token in communication with the secure token reader and to produce said trusted image and means to control the display processing means to combine said trusted image with at least a portion of the main image in order to indicate to a user that the data processing system is operating in the trusted operating mode.

5. A data processing system according to claim 4, further comprising secure user input means, in communication with the trusted component via a secure communications path, by which a user may securely interact with the trusted process.

6. A data processing system according to claim 4, wherein the trusted component and the secure token each comprise means to interact with the other in order to execute the trusted process.

7. A data processing system according to claim 6, wherein the trusted component comprises means to control the display processing means to combine the trusted image with the main image to highlight at least a portion of the main image as being associated with execution of the trusted process.

8. A data processing system according to claim 7, wherein the trusted component comprises means to prevent modification by the display processing means of at least the highlighted portion of the main image substantially while the data processing system is executing the trusted process.

9. A data processing system according to claim 7, wherein the trusted component controls the display processing means to highlight the main image, or portion thereof, by producing one or more of the following visual effects:
a border, or an indicator (or indicators) defining a border, characterised by the trusted image and placed at least partly around the main image or portion thereof;
a background pattern characterised by the trusted image forming at least part of the background of the main image or portion thereof;
an image characterised by the trusted image formed within the main image or portion thereof; and/or
a text message characterised by the trusted image formed within the main image or portion thereof.

10. A data processing system according to claim 6, wherein the trusted component comprises means to interact with the secure token to execute a trusted process which includes generating a digital signature characteristic of at least a portion of the main image.

11. A data processing system according to claim 4, wherein the trusted component comprises means to verify the identity of the secure token.

12. A data processing system according to claim 4, wherein the secure token comprises means to verify the identity of the trusted component.

13. A data processing system according to claim 4, wherein each of the trusted component and the secure token include nonvolatile memory.

14. A data processing system according to claim 13, wherein the trusted component and the secure token each hold a respective private cryptographic key in the respective nonvolatile memory.

15. A data processing system according to claim 14, wherein the trusted component and the secure token each contain a digital certificate including a public key which forms a private/public key pair with their respective private key.

16. A data processing system according to claim 15, wherein the trusted component and the secure token each comprise means to receive encrypted data from the other and use their respective private keys to decrypt the encrypted data and/or verify that the encrypted data was encrypted using the corresponding public key.

17. A data processing system according to claim 4, wherein the data characterising the trusted image is stored by the secure token in compressed form and the trusted component comprises means to decompress the data.

18. A data processing system according to claim 4, wherein the data characterising the trusted image is stored by the secure token in encrypted form and the trusted component comprises means to decrypt the data and/or verify that the data was encrypted using a corresponding encryption key.

19. A data processing system according to claim 4, wherein the data characterising the trusted image comprises a series of instructions and the trusted component comprises means to interpret the instructions in order to generate the trusted image data.

20. A computer platform capable of operating in a trusted operating mode, the computer platform comprising:
a main processor programmed to execute at least one application process and for generating signals characterising a main image to be displayed;
a trusted component protected against unauthorised modification comprising a trusted component processor programmed to execute a trusted process in a trusted operating mode;
a display processor for receiving said signals and generating respective display signals for driving a visual display unit to display the main image,
wherein the trusted component processor is programmed to acquire and/or generate trusted image data and to control the display processor to combine a respective trusted image with at least a portion of the main image in order to indicate to a user that the computer platform is operating in the trusted operating mode.

21. A computer platform capable of operating in a trusted operating mode, the computer platform comprising:
a main processor programmed to execute at least one application process and for generating signals characterising a main image to be displayed;
a secure token reader for reading data from and/or writing data to a removable secure token;
a trusted component comprising a trusted component processor programmed to execute a trusted process in a trusted operating mode;
a display processor for receiving said signals and generating respective display signals for driving a visual display unit to display the main image,
wherein the trusted component processor is programmed to acquire data characterising a trusted image from a secure token in communication with the secure token reader and to produce said trusted image and is further adapted to control the display processor to combine said trusted image with at least a portion of the main image in order to indicate to a user that the computer platform is operating in the trusted operating mode.

22. A method of providing a trusted user interface in a data processing system comprising a main processor and a trusted component containing a trusted component processor protected from unauthorised modification, the method comprising:
the main processor running an application process to generate main image data and sending the main image data to a display processing system;
the trusted component processor operating a trusted process and producing trusted image data;
the trusted component processor controlling the output of the display processing system such that it comprises a combination of the trusted image data and the main image data; and
the display processing system passing said combination as displayable data to a visual display unit for display to a user such that an image displayed on the visual display unit indicates to the user that the data processing system is operating in a trusted mode associated with the trusted process.

23. The method of claim 22, wherein the display processing system comprises a pixel generator, a frame buffer memory, and a video controller for generating data to be displayed by the visual display unit, wherein:
the step of sending the main image data to the display processing system comprises sending the main image data to the pixel generator which converts the main image data into pixel data and writes the pixel data to the frame buffer memory;
the step of producing trusted image data comprises writing the trusted image data into the frame buffer memory; and
the step of passing said combination as displayable data to a visual display unit comprises the video controller repeatedly reading combined pixel data from the frame buffer memory and generating signals suitable for driving the visual display unit to display the image represented by the combined pixel data.

24. The method of claim 22, wherein said combination indicates association of at least a part of the main image data with a trusted process.

25. The method of claim 24, comprising the further step of the trusted component processor preventing modification of the main image data associated with the trusted process during execution of the trusted process.

26. The method of claim 25, comprising preventing alteration of the main image data associated with the trusted process in the frame buffer memory during execution of the trusted process.

27. The method of claim 22, the data processing system further comprising a secure token reader adapted to read data from or write data to a removable secure token, the secure token reader being in communication with the trusted component processor, the method further comprising:
the trusted component processor obtaining data characterising the trusted image data from a secure token of a user.

28. The method of claim 27, wherein the secure token comprises a secure token processor, and whereby in execution of the trusted process, both the trusted component processor and the secure token processor execute process steps.

29. The method of claim 27, wherein said trusted process includes generating a digital signature for association with at least a part of the main image data or a document associated therewith.

30. The method of claim 27, wherein the secure token processor and the trusted component processor participate in an authentication process.

31. The method of claim 27, wherein said authentication process comprises authentication of the secure token to the trusted component processor and authentication of the trusted component to the secure token processor.

32. The method of claim 27, wherein data exchanged between the secure token processor and the trusted component processor is encrypted.

33. The method of claim 27, wherein the trusted component and the secure token each have a respective memory containing a cryptographic key.

34. The method of claim 27, wherein the step of obtaining data characterising the trusted image data from a secure token of a user comprises the trusted component processor obtaining a series of instructions for generating the trusted image data from the secure token.

35. The method of claim 27, wherein the step of obtaining data characterising the trusted image data from a secure token of a user comprises the trusted component processor obtaining the trusted image data from the secure token.

* * * * *